United States Patent
Schriber et al.

(10) Patent No.: US 11,727,438 B2
(45) Date of Patent: Aug. 15, 2023

(54) METHOD AND SYSTEM FOR COMPARING HUMAN-GENERATED ONLINE CAMPAIGNS AND MACHINE-GENERATED ONLINE CAMPAIGNS BASED ON ONLINE PLATFORM FEEDBACK

(71) Applicant: Nanocorp AG, Zurich (CH)

(72) Inventors: Sasha Anna Schriber, Zurich (CH); Francesco Ambrosiano, Zurich (CH); Leon Palaić, Zurich (CH); Markus Hans Gross, Zurich (CH)

(73) Assignee: Nanocorp AG, Zurich (CH)

( * ) Notice: Subject to any disclaimer, the term of this patent is extended or adjusted under 35 U.S.C. 154(b) by 0 days.

(21) Appl. No.: 16/803,279

(22) Filed: Feb. 27, 2020

(65) Prior Publication Data

US 2020/0273064 A1 Aug. 27, 2020

Related U.S. Application Data

(60) Provisional application No. 62/811,444, filed on Feb. 27, 2019.

(51) Int. Cl.
*G06Q 30/00* (2023.01)
*G06Q 30/0251* (2023.01)
(Continued)

(52) U.S. Cl.
CPC ... *G06Q 30/0254* (2013.01); *G06F 16/24578* (2019.01); *G06F 40/279* (2020.01);
(Continued)

(58) Field of Classification Search
CPC .......... G06Q 30/0254; G06Q 30/0203; G06Q 30/0244; G06Q 30/0277; G06N 20/00;
(Continued)

(56) References Cited

U.S. PATENT DOCUMENTS

2008/0140476 A1* 6/2008 Anand ............... G06Q 30/0276
705/14.43
2010/0185689 A1 7/2010 Hu et al.
(Continued)

OTHER PUBLICATIONS

Chatwin; An_overview_of_computational_challenges_in_online_advertising; ACC 2013; pp. 5990-6007; 2013.*
(Continued)

*Primary Examiner* — Radu Andrei
(74) *Attorney, Agent, or Firm* — Meunier Carlin & Curfman LLC

(57) ABSTRACT

A campaign management system manages campaign datasets, wherein a campaign dataset corresponds to selections and instructions for executing an online campaign. A campaign dataset might be created by a human or a machine, or multiple humans and computers in a crowd-sourcing approach. Campaign datasets can be processed to determine an expected quality metric, a post-run quality metric, and a confidence level. A campaign comparator can compare campaign datasets to identify similar campaign datasets so that an expected quality metric, a post-run quality metric, and/or a confidence level from one campaign dataset can be imputed to another campaign dataset.

20 Claims, 19 Drawing Sheets

(51) Int. Cl.
*G06F 16/2457* (2019.01)
*G06F 40/279* (2020.01)
*G06F 40/30* (2020.01)
*G06Q 30/0203* (2023.01)
*G06N 20/00* (2019.01)
*G06Q 30/0242* (2023.01)
*G06Q 30/0241* (2023.01)

(52) U.S. Cl.
CPC ............ *G06F 40/30* (2020.01); *G06N 20/00* (2019.01); *G06Q 30/0203* (2013.01); *G06Q 30/0244* (2013.01); *G06Q 30/0277* (2013.01)

(58) Field of Classification Search
CPC ... G06F 16/24578; G06F 40/279; G06F 40/30
See application file for complete search history.

(56) References Cited

U.S. PATENT DOCUMENTS

| | | | |
|---|---|---|---|
| 2010/0257022 A1* | 10/2010 | Wang | G06Q 30/0242 705/14.42 |
| 2011/0320429 A1 | 12/2011 | Doig et al. | |
| 2012/0004983 A1* | 1/2012 | Borthwick | G06Q 30/0246 705/14.45 |
| 2013/0080244 A1* | 3/2013 | Person | G06Q 30/02 705/14.43 |
| 2014/0258001 A1* | 9/2014 | Ramaksrihnan | G06Q 30/0276 705/14.72 |
| 2015/0052098 A1 | 2/2015 | Kveton et al. | |
| 2016/0210655 A1* | 7/2016 | Cottle | G06Q 30/0273 |
| 2018/0060437 A1 | 3/2018 | Gao et al. | |
| 2021/0158390 A1* | 5/2021 | Sheppard | G06F 17/15 |

OTHER PUBLICATIONS

Shahriar; Online Model Evaluation of Advertising Paltforms; Turn Inc, 10 pages; 2010.*

International Search Report issued in PCT Application No. PCT/IB2020/051692, dated May 26, 2020.

* cited by examiner

| | |
|---|---|
| Program Method: Labels Compressor | |
| 1: | procedure CompressLabels |
| 2: | $N \leftarrow$ classified nodes |
| 3: | $G \leftarrow$ taxonomy graph |
| 4: | nodeDepths $\leftarrow$ HashMap() |
| 5: | compressedResult $\leftarrow$ HashMap() |
| 6: | for node in N do |
| 7: | $nodeDepths_{node} \leftarrow node.depth$ |
| 8: | $compressedResult_{node} \leftarrow 0$ |
| 9: | sortedNodes $\leftarrow$ sort(nodeDepths) |
| 10: | for node in sortedNodes do |
| 11: | nodeAncestors $\leftarrow$ findAncestors(node, G) |
| 12: | for ancestor in nodeAncestors do |
| 13: | if ancestor in compressedResult then |
| 14: | compressedResult.remove(ancestor) |
| 15: | return compressedResult |

FIG. 7

| | Algorithm 2: Targeting options generator |
|---|---|
| 1: | procedure GENERATETARGETINGOPTIONS(campaign, similarCampaigns, $C_D$, $T_{confidence}$, $M_{best}^{confidence}$ ) |
| 2: | $productLabels \leftarrow extractProductLabels(campaign, similarCampaigns)$ |
| 3: | $S_{targeting}^{final} \leftarrow \emptyset$ |
| 4: | if $length(similarCampaigns) \geq 1$ then |
| 5: | $sampleScores \leftarrow HashMap()$ |
| 6: | for productLabel in productLabels do |
| 7: | for targetingOption $t$ in productLabel do |
| 8: | $score \leftarrow sample \sim dist(\theta_t^{product/service})$ |
| 9: | $sampleScores_t \leftarrow score$ |
| 10: | $S_{targeting}^{evaluation} \leftarrow topNtargetingOptions(sampleScores)$ |
| 11: | $S_{targeting}^{evaluation} \leftarrow \emptyset$ |
| 12: | for targetingOption $t$ in $S_{targeting}^{evaluation}$ do |
| 13: | $confidentEntity \leftarrow max(P(\theta_t^{product/service} \in C_D\ score(t_{product/service})), M_{best}^{confidence})$ |
| 14: | if $confidentEntity M_{best}^{confidence}$ then |
| 15: | $S_{targeting}^{reevaluation}.add(t)$ |
| 16: | else |
| 17: | $S_{targeting}^{final}.add(t)$ |
| 18: | for targetingOption $t$ in $S_{targeting}^{reevaluation}$ do |
| 19: | observe marketer feedback $\theta_{t*}^{product/service}$ |
| 20: | update dist $(\theta_{t*}^{product/service})$ with $\theta_{t*}^{product/service}$ |
| 21: | else |
| 22: | for productLabel in productLabels do |
| 23: | $S_t \leftarrow$ initialize targeting options from marketer |
| 24: | for t in $S_t$ do |
| 25: | initialize distribution parameters $\theta_t^{product/service}$ |
| 26: | $S_{targeting}^{final} \leftarrow$ append $t$ |
| 27: | $productLabel \leftarrow$ assign targeting options set $S_t$ |
| 28: | return $S_{targeting}^{final}$ |

FIG. 9

| | |
|---|---|
| Algorithm 4: Marketeer scheduler | |
| 1: | procedure GETBESTMARKETEER |
| 2: | $C \leftarrow campaign$ |
| 3: | $M_a \leftarrow getAvailableMarketeers(M)$ |
| 4: | $M_a^{scores} \leftarrow \{\}$ |
| 5: | $M_a^{confidence} \leftarrow \{\}$ |
| 6: | for marketeer $M$ in $M_a$ do |
| 7: | $C_M^{closest} \leftarrow findClosestCampaignsOfMarketeer(C,M)$ |
| 8: | $M_r \leftarrow getMarketeerSuccessEstimate(M, C_M^{closest}, C)$ |
| 9: | $M_c \leftarrow getMarketeerCostEstimate(M, C_M^{closest}, C)$ |
| 10: | $M_a^{scores}[M] \leftarrow M_c/M_r$ |
| 11: | $M_{best} \leftarrow min(M_a^{scores})$ |
| 12: | $M_{best}^{confidence} \leftarrow getMarketeerConfidence(C, C_{M_{best}}^{closest}, M)$ |
| 13: | return $M_{best}, M_{best}^{confidence}$ |

FIG. 11

| | |
|---|---|
| Algorithm 5: Raw reward thompson sampling | |
| 1: | procedure BAYESIANAGENT |
| 2: | $B \leftarrow$ overall budget |
| 3: | $T \leftarrow$ campaign length |
| 4: | $N \leftarrow$ sample size |
| 5: | arms $\leftarrow$ number of arms |
| 6: | initialAlpha $\leftarrow 1$ |
| 7: | initialBeta $\leftarrow 1$ |
| 8: | for k in arms do |
| 9: | $\Gamma_{1,k} \leftarrow$ initialAlpha, initialBeta |
| 10: | for t in T do |
| 11: | for n in N do |
| 12: | for k in arms do |
| 13: | $r_{t,k} \leftarrow$ sample from $\Gamma_{t,k}$ |
| 14: | Select best arm $k^*$ |
| 15: | Set best arm count $s_k^* = s_k^* + 1$ |
| 16: | for k in arms do |
| 17: | $w_{k,t} \leftarrow S_k/N$ |
| 18: | $a_{k,t} \leftarrow w_{k,t} * B_t$ |
| 19: | $r_{k,t} \leftarrow$ Reward from arm $K$ |
| 20: | $\Gamma_{t,k} \leftarrow$ updateParams(rewards) |

FIG. 12

| | |
|---|---|
| Algorithm 6: Thompson sampling including cost | |
| 1: | procedure COSTBAYESIANAGENT |
| 2: | $B \leftarrow$ overall budget |
| 3: | $T \leftarrow$ campaign length |
| 4: | $N \leftarrow$ sample size |
| 5: | arms $\leftarrow$ number of arms |
| 6: | initialRewardAlpha $\leftarrow 1$ |
| 7: | initialRewardBeta $\leftarrow 1$ |
| 8: | initialCostAlpha $\leftarrow 1$ |
| 9: | initialCostBeta $\leftarrow 1$ |
| 10: | for k in arms do |
| 11: | $\Gamma_{1,k}^{reward} \leftarrow$ initialRewardAlpha, initialRewardBeta |
| 12: | $\Gamma_{1,k}^{cost} \leftarrow$ initialRewardAlpha, initialRewardBeta |
| 13: | for t in T do |
| 14: | for n in N do |
| 15: | for k in arms do |
| 16: | $r_{t,k} \leftarrow$ sample from $\Gamma_{1,k}^{reward}$ |
| 17: | $c_{t,k} \leftarrow$ sample from $\Gamma_{1,k}^{cost}$ |
| 18: | $v_{t,k} \leftarrow r_{t,k}/c_{t,k}$ |
| 19: | Select arm with max $v_{t,k}^*$ |
| 20: | Set best arm count $s_k^* = s_k^* + 1$ |
| 21: | for k in arms do |
| 22: | $w_{k,t} \leftarrow S_k/N$ |
| 23: | $a_{k,t} \leftarrow w_{k,t} * B_t$ |
| 24: | $r_{k,t} \leftarrow$ Reward from arm k |
| 25: | $c_{k,t} \leftarrow$ Cost from arm k |
| 26: | $\Gamma_t^{reward} \leftarrow$ updateParams(rewards, allocations) |
| 27: | $\Gamma_t^{cost} \leftarrow$ updateParams(costs, allocations) |

FIG. 13

| Algorithm 7: Raw feedback update |
| --- |
| 1:     procedure UPDATE BAYESIANAGENT |
| 2:         $t \leftarrow$ *current step* |
| 3:         for k in arms do |
| 4:             $alpha_{t,k} \leftarrow alpha_{t-1,k} + reward_{t,k}$ |
| 5:             $beta_{t,k} \leftarrow beta_{t-1,k} + allocation_{t,k}$ |
| 6:             $\Gamma_{t,k} \leftarrow alpha_{t,k}, beta_{t,k}$ |
| 8:     procedure UPDATE COSTBAYESIANAGENT |
| 9:         $t \leftarrow$ *current step* |
| 10:        for   do |
| 11:            for k in arms do |
| 12:                $alpha_{t,k}^{reward} \leftarrow alpha_{t,k}^{reward} + reward_{t,k}$ |
| 13:                $beta_{t,k}^{reward} \leftarrow beta_{t,k}^{reward} + allocation_{t,k}$ |
| 14:                $\Gamma_{t,k}^{reward} \leftarrow alpha_{t,k}^{reward}, beta_{t,k}^{reward}$ |
| 15:                $alpha_{t,k}^{cost} \leftarrow alpha_{t,k}^{cost} + allocation_{t,k}$ |
| 16:                $\Gamma_t \leftarrow alpha_{t,k}^{cost}, beta_{t,k}^{cost}$ |

FIG. 14

Algorithm 8: Bernoulli update

1: procedure UPDATE BAYESIANAGENT
2:    $t \leftarrow$ current step
3:    $r \leftarrow$ rewards
4:    $K \leftarrow$ number of arms
5:    $N \leftarrow$ sample size
6:    for k in arms do
7:       $w_{t,k} \leftarrow r_{t,k} / \sum_{n=1}^{K} r_{t,n}$
8:    for k in arms do
9:       $successCount_k \leftarrow 0$
10:      for n in N do
11:         $successCount_k\mathrel{+}= \text{Bern}(w_{t,k})$
12:      if $successCount_k \geq N/2$ then
13:         $alpha_{t,k} \leftarrow alpha_{t,k} + 1$
14:         $beta_{t,k} \leftarrow beta_{t,k} + 0$
15:      else
16:         $alpha_{t,k} \leftarrow alpha_{t,k} + 0$
17:         $beta_{t,k} \leftarrow beta_{t,k} + 1$
18:      $\Gamma_{t,k} \leftarrow alpha_{t,k}, beta_{t,k}$

FIG. 15

| | |
|---|---|
| Algorithm 9: Bernoulli update | |
| 1: | procedure UPDATE COSTBAYESIANAGENT |
| 2: | $t \leftarrow$ current step |
| 3: | $r \leftarrow$ rewards |
| 4: | $c \leftarrow$ costs |
| 5: | $K \leftarrow$ number of arms |
| 6: | $N \leftarrow$ sample size |
| 7: | for k in rewards do |
| 8: | $w_{t,k}^{reward} \leftarrow r_{t,k} / \sum_{n=1}^{K} r_{t,n}$ |
| 9: | $w_{t,k}^{cost} \leftarrow c_{t,k} / \sum_{n=1}^{K} c_{t,n}$ |
| 10: | for k in arms do |
| 11: | $successRewardCount_k \leftarrow 0$ |
| 12: | $successCostCount_k \leftarrow 0$ |
| 13: | for n in N do |
| 14: | $successRewardCount_k{+} = \mathrm{Bern}(w_{t,k}^{reward})$ |
| 15: | $successCostCount_k{+} = \mathrm{Bern}(w_{t,k}^{cost})$ |
| 16: | if $successRewardCount_k \geq N/2$ then |
| 17: | $alpha_{t,k}^{reward} \leftarrow alpha_{t,k}^{reward} + 1$ |
| 18: | $beta_{t,k}^{reward} \leftarrow beta_{t,k}^{reward} + 0$ |
| 19: | else |
| 20: | $alpha_{t,k}^{reward} \leftarrow alpha_{t,k}^{reward} + 0$ |
| 21: | $beta_{t,k}^{reward} \leftarrow beta_{t,k}^{reward} + 1$ |
| 22: | if $successCostCount_k \geq N/2$ then |
| 23: | $alpha_{t,k}^{cost} \leftarrow alpha_{t,k}^{cost} + 1$ |
| 24: | $beta_{t,k}^{cost} \leftarrow beta_{t,k}^{cost} + 0$ |
| 25: | else |
| 26: | $alpha_{t,k}^{cost} \leftarrow alpha_{t,k}^{cost} + 0$ |
| 27: | $beta_{t,k}^{cost} \leftarrow beta_{t,k}^{cost} + 1$ |
| 28: | $\Gamma_{t,k}^{reward} \leftarrow alpha_{t,k}^{reward}, beta_{t,k}^{reward}$ |
| 29: | $\Gamma_{t,k}^{cost} \leftarrow alpha_{t,k}^{cost}, beta_{t,k}^{cost}$ |

FIG. 16

METHOD AND SYSTEM FOR COMPARING HUMAN-GENERATED ONLINE CAMPAIGNS AND MACHINE-GENERATED ONLINE CAMPAIGNS BASED ON ONLINE PLATFORM FEEDBACK

FIELD OF THE INVENTION

The present disclosure generally relates to computer systems that generate data representative of collections of online actions that form a marketing campaign. The disclosure relates more particularly to apparatus and techniques for generating campaign data sets using human inputs, generating campaign data sets via machine learning, and comparing those to optimize online marketing efforts.

BACKGROUND

Online advertising can be a useful method of advertising, if the right advertisements reach the right consumers or potential consumers. With rapidly changing interests, many different products/services to offer, and competing advertisers, achieving favorable results from an advertising campaign can be difficult. In a simple implementation, a marketing campaign manager inputs desired keywords, considers bids and offers to place advertisements based on those keywords and then places advertisements.

Advertising can be effective if the right advertisements (e.g., ads) reach the right consumers or potential consumers. Currently, to create effective ads, marketing experts skilled in marketing products to consumers generally rely on conventional advertising information and media, such as paper ads, flyers, and often employ online advertising through online banner ads, social media advertisements, etc. to promote products and services to consumers.

Online advertising often involves humans compiling details for a campaign, including target audience, content, expenditures, and selection of platform. A human marketing manager might determine what should be said in an online advertisement, what keywords to bid on, what targets to approach, and the like. The success of a campaign might be determined by considering additional sales or inquiries that occurred in response to an online ad buy, if such data could be obtained. A limitation of this approach is that online advertising campaigns might not work well if the marketing manager is not skilled in the area or is unaware of the target audiences.

Marketing expenses could be more focused if a computer process could assess the success of an advertising campaign, but it can be hard for a computer to evaluate the many factors that go into the success or failure of an advertising campaign, and which factors matter and which factors do not. In addition to the difficulty of determining a success or failure of an online advertising campaign, it can be difficult to identify similarity of online advertising campaigns, which would be informative to a machine learning process that would evaluate the likely success or failure of an online advertising campaign based on results for similar online advertising campaigns, giving more weight to more similar online advertising campaigns.

Unfortunately, success of such conventional advertising and marketing campaigns varies widely based on the skill of the advertiser to create effective ads, ad placement in the market, and consumer adoption of the advertised products. Moreover, advertisement design and placement are often critical factors for reaching the right consumer audience, which similar to creating advertisement media, relies on the personal expertise and skill of the marketing personnel to advise their client on ad content and design, and where and when their advertisement media should be placed.

The industry has responded to the large variability of advertising design and placement by using advertising testing techniques. For example, testing techniques such as testing different advertising placements, testing variations in the advertising design, testing different tag lines, and the like, are employed in order to determine what types of ads are effective and where and when such advertisements should be placed in order to increase the sales of advertised products and services.

However, even with conventional advertising testing methods, the variation in advertisement creation, testing, and deployment is heavily based on the subjective experience of advertising and marketing professionals. Because of such subjective variability, advertising campaigns are often extremely costly for suppliers trying to find the right combination of marketing professional, ad design, and ad campaigns that are effective to sell their product and services.

Therefore, what is needed is a system and method that provides a more efficient and effective means to implement advertising campaigns that overcomes the above limitations.

SUMMARY

A campaign management system manages campaign datasets, wherein a campaign dataset corresponds to selections and instructions for exciting an online campaign. A campaign dataset might be created by a human or a machine, or multiple humans and computers in a crowd-sourcing approach. Campaign datasets can be processed to determine an expected quality metric, a post-run quality metric, and a confidence level. A campaign comparator can compare campaign datasets to identify similar campaign datasets so that an expected quality metric, a post-run quality metric, and/or a confidence level from one campaign dataset can be imputed to another campaign dataset. Campaign datasets can be passed between human creators and machine creators to improve on and learn from each other.

In one approach for determining a targeting value for a proposed campaign, the campaign evaluator might extract other campaign datasets from a campaign dataset repository and filter out those other campaign datasets to only further use those campaign datasets that the campaign evaluator determines are similar to the proposed campaign's campaign dataset. Where there is little data from similar campaign datasets and/or few similar campaign datasets, the campaign evaluator might assign a lower confidence value to the proposed campaign dataset. On the other hand, if the campaign evaluator finds many very similar campaign datasets in the repository, and their targeting values are consistent, the campaign evaluator might assign a high confidence value to the proposed campaign. The high confidence value could mean a high confidence that the proposed campaign would have a high targeting value or could mean a high confidence that the proposed campaign would have a low targeting value. Either way, having that targeting value and that confidence value, the campaign evaluator can use the targeting value and the confidence value to allocate resources. Perhaps the campaign evaluator might allocate a smaller budget for a campaign with a low targeting value and a larger budget for a campaign with a high targeting value.

The campaign evaluator can process a plurality of campaign datasets to find sets of campaign datasets that share some similarity, to find a targeting of a campaign dataset, perhaps for use in determining whether coverage of different targets is sufficiently provided, and a campaign evaluator can also evaluate a campaign that is ongoing or is proposed, as well as computing confidence values for each of those.

Various steps can be performed for determining a similarity metric between two or more campaign datasets. By generating similarity metrics among campaign datasets, a trained machine learning tool, such as a neural network, can process a campaign dataset to determine various other metrics such as a targeting value and a confidence value.

A campaign evaluator can compute an expected quality metric for a campaign dataset before executing the campaign. Pairs (or sets) of campaign datasets can have a similarity metric. A quality metric might be known for each past used campaign dataset, and might be inferred by the AI for as yet unused campaign datasets based on the quality metrics of past used campaign datasets that are determined to be similar.

In some embodiments, a campaign evaluator is configured to process a campaign dataset to generate two or more split campaign datasets, wherein each of the split campaign datasets represents a subset of the input campaign dataset. By splitting a campaign dataset, they can be processed separately, and campaigns initiated separately, as well as being evaluated separately.

In some embodiments, parts of a campaign dataset are presented in a user interface to a human marketing manager, who might input changes to the campaign dataset. The user interface might connect back to the campaign evaluator to get targeting value changes and confidence value changes from the human marketing manager. The human marketing manager can use this as a training tool or as an optimizer. For example, the human marketing manager might view a targeting value, make an adjustment to one data element of the campaign dataset, request a rerun of the evaluation (or this might be done automatically), view the new targeting value, and learn from that whether that adjustment is good to use.

The human marketing manager can also view the campaign dataset, including its targeting value and its confidence value, and decide whether to emit that campaign dataset to an online advertising platform. As each emission to an online advertising platform could cost the campaigning entity money, the human marketing manager working for the campaigning entity would want to ensure that the money is well-spent, but might not be able to fully determine that. The campaign evaluator might process the campaign dataset to provide the human marketing manager information desired for decision-making, or the campaign evaluator might emit a campaign dataset to an online advertising platform autonomously.

A campaign dataset might include data elements that are not transmitted to the online advertising platform when emitting the campaign dataset.

These operations might be performed by executing executable instructions stored in a non-transitory computer-readable storage medium that, when executed by one or more processors of a computer system, cause the computer system to perform those operations.

The following detailed description together with the accompanying drawings will provide a better understanding of the nature and advantages of the present invention.

BRIEF DESCRIPTION OF THE DRAWINGS

Various embodiments in accordance with the present disclosure will be described with reference to the drawings, in which:

FIG. 7 illustrates a process for computing label compression.

FIG. 9 illustrates an example process for parameterizing targeting options.

FIG. 11 illustrates a process for marketeer scheduling.

FIG. 12 illustrates an aspect of distribution of rewards for a platform.

FIG. 13 illustrates an aspect of distribution of rewards for a platform.

FIG. 14 illustrates an aspect of distribution of rewards for a platform.

FIG. 15 illustrates an aspect of distribution of rewards for a platform.

FIG. 16 illustrates an aspect of distribution of rewards for a platform.

DETAILED DESCRIPTION

Figure 1:
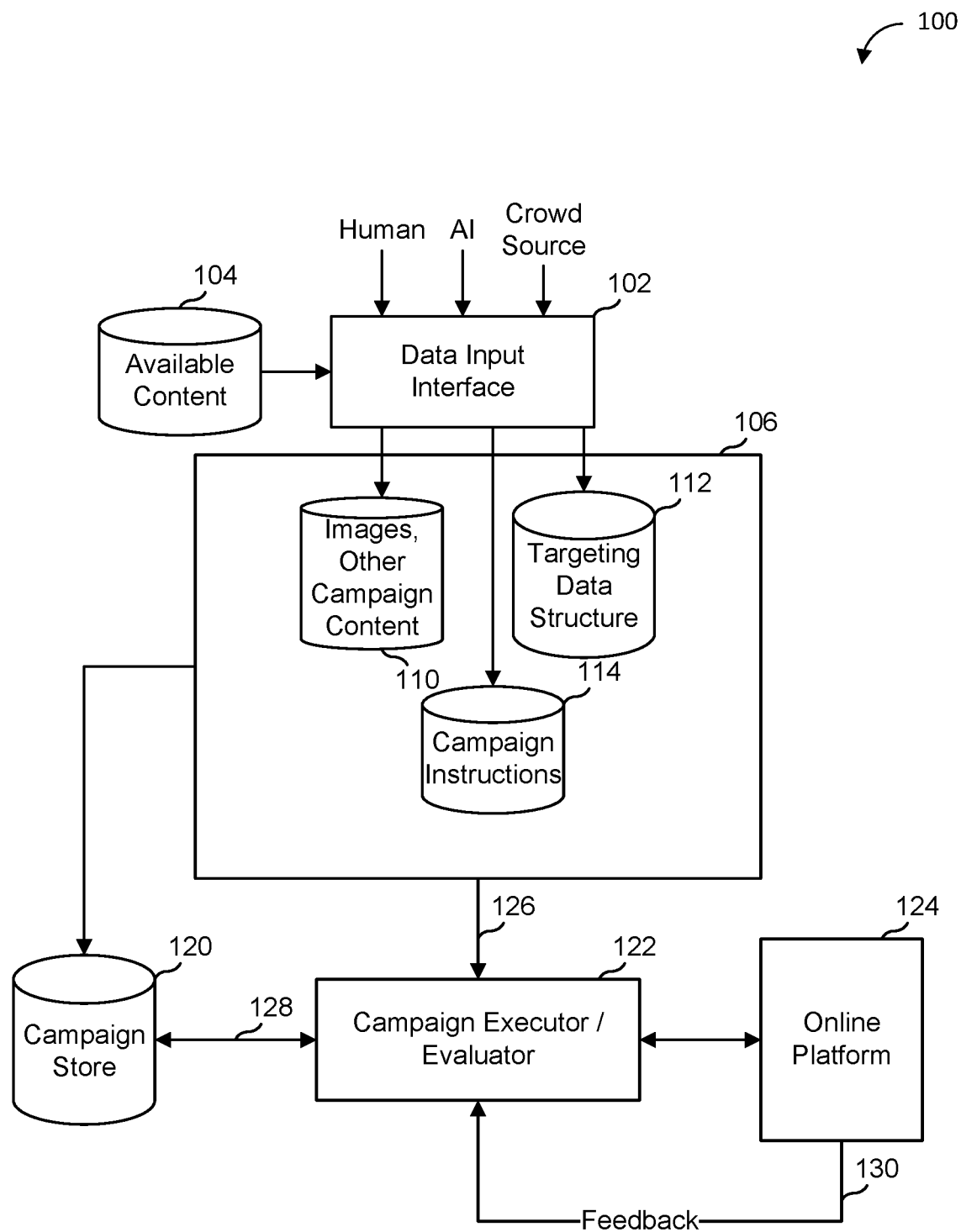
FIG. 1 illustrates an example of a campaign generation system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

In examples herein, campaign data structures are referenced. An example of a campaign dataset is a collection of data, such as topics, targeting data structures (e.g., keywords, phrases), advertising content, campaign instructions, links to online advertising platforms, computer-readable instructions that initiate the dissemination, purchase, management, and/or review of a marketing campaign over online platforms. Some of these datasets may be storable as simple strings, or as arrays of strings or other data elements.

As an example, a brand seeking to promote a product or service might initiate a marketing campaign that involves payments made to online platforms, content viewed by targeted viewers, all in such a way that preferably the brand reaches a desired set of viewers for a desired cost. Such a campaign dataset would be rated higher than a campaign dataset that fails to reach the target market and/or exceeds a desired marketing budget.

An online advertising campaign that is processed by a campaign evaluator, which can be a computer process, is represented by a campaign dataset. Campaign datasets can be stored in memory and might represent planned future campaign datasets or past campaign datasets, the latter of which might include data elements representing performance of the past campaign.

A campaign dataset might be generated by an automated process, constructed from human input, or a combination thereof. Prior to running a campaign, such as prior to submitting content, instructions, and payment to an online platform, the campaign evaluator might evaluate the campaign dataset and output an expected quality metric— representing an estimated value of running the campaign represented by the campaign dataset—and a confidence value—representing a machine-determined level of confidence that that the expected quality metric would correspond to an ultimate campaign value should the campaign be run.

As the campaign dataset is representable in computer-readable form, different campaign datasets can be processed by an analysis engine, such as to compare two campaign datasets to determine if they are essentially similar or to modify campaign datasets in efforts to improve a campaign outcome. A campaign dataset might be created from human user input, such as input from a marketing manager or marketing strategist, or might be created from a machine learning system that learns campaign generation from past campaigns and their results.

The product or service might be something the marketer is selling or it might be something that the marketer is promoting more generally, such as a campaign to raise awareness of a brand or a cause, or to encourage viewers to take some action. As used herein, recipients of content or messages that are part of a campaign might be consumers of products and/or services or might be people or organizations that the campaign originator might wish to reach with a targeted message. While such targets might be referred to herein as viewers, it should be understood that a campaign might also involve nonvisual messages directed at targets.

A campaign dataset might include elements such as lists of topics for the campaign, such as concepts that can be expressed by user input. For example, topics might relate to interests, descriptions of business purposes, general themes, products, locations, times of day, types of business, keywords, other targeting phrases, and other expressions. Topics might also be used to describe a target customer group, a product group of an enterprise, and the like. Topics for a campaign might be represented as an array of topic records, data stored in a database, perhaps storable and readable representations, such as digital storage, cloud storage, or in any transient or non-transient electronic media form, representing a plurality of topic data elements. Arrays of topic records might be mutable and can be inputs or outputs of different processes that are performed as described herein.

A campaign dataset might include targeting data structures. As further described herein, a targeting data structure may be configured to represent some standardized representation of a targeting scope of a campaign, expressed in a natural or in another language. For example, a natural language, symbols, etc., may be employed to input to an advertising system a target audience for the advertising campaigns including specifying target demographics and other information, such as personal tastes, purchase history, brand preferences, and the like, and may include other data such as personal data, biometric data, etc. A targeting data structure might comprise data representing keywords (e.g., keywords that form inputs to an advertising platform or other keyword-based advertising platform or where advertising is purchased or presented based on selected keywords or phrases), a selection of user interests (e.g., on the social media advertising platform or other social media platforms that filter or present content based on data structures representing user interests), an encoding of a distribution of targets in terms of single users or user groups, and embeddings in a learned or predefined targeting space. In addition, targeting data structures might include arrays of keyword records stored, for example, as readable data representing keyword entities or phrases, and might be mutable, and represent inputs and/or outputs of different processes that are performed as described herein.

A campaign data structure might include instructions or details that are usable in an automated fashion to operate a campaign. For example, in addition to topics and keywords/target phrases, a campaign dataset might also include data elements corresponding to campaign lifecycles (e.g., when to start a campaign and when to end it), budget allocations, content for the campaign. A campaign might be mutable over its lifetime and might be optimized before, during, and/or after by adjusting the parameters of the campaign dataset. Campaign datasets can be compared to detect similarities between campaigns and inform subsequent decisions. For example, a campaign dataset might specify that Products P1, P2, and P3 are to be advertised using advertising content AC1 and AC2 over a period of W weeks on social media platforms SMP1, SMP2, and SMP3, with a budget not to exceed $ D and a goal to reach N thousands of impressions of unique viewers during the course of the campaign. That campaign dataset might include instruction sets that can be submitted to the social media platforms, perhaps using an application programming interface (API).

In examples herein, creators of campaign datasets can be humans alone, humans with machine feedback, machines alone, or machines with human feedback. In some embodiments, a machine is trained on human-created campaign datasets and once trained, can be used to train humans and/or improve on human-created campaign datasets. Examples of human creators include humans who are interacting with the systems, such as business owners who make use of the system to generate campaigns.

A marketer might be a human who interacts with a backend portion of the system. These interactions might include manual optimization of different campaign parameters, making decisions about future steps in the campaign's lifecycle, and adding knowledge into the system to inform future decisions.

In a specific embodiment, methods and apparatus for generating campaign datasets are provided. A system for generating campaign datasets could handle human-generated campaign datasets and computer-generated campaign datasets. A computer process and a human can provide a confidence score for their own campaign dataset (a computer indicates a confidence score for its campaign dataset and a human—optionally—provides their assessment of their own work when submitting their campaign dataset). Each generator might then determine an evaluation score for the other generator's campaign dataset—the computer evaluates the human-generated campaign dataset (including the human's confidence score, if applicable) and the human might evaluate the computer-generated campaign dataset and the computer's confidence score. The evaluation values can be stored as feedback that the generators (computers and humans) can learn from. The computer might submit a campaign to one or more online platforms and obtain results of the campaign. At the outset of running the system, the computer might not have any feedback and would likely generate campaign datasets with low confidence values. Over time, the computer and the human(s) might learn what works. If a computer-generated campaign dataset has a high enough confidence level, the human evaluation step might be skipped and the campaign submitted without human review, thus scaling and automating a process.

In assessing a proposed campaign dataset, the computer might search a database of prior campaigns, perform a matching process to identify similar campaigns, and generate a confidence level of a new campaign based on performance of past campaigns that are determined to be similar to the new campaign. In another aspect, the computer can evaluate a campaign while it is being run, by obtaining in-time feedback before a campaign completes. From that, the computer can decide to modify the campaign and/or modify relative budget weights (e.g., if campaign spending is split evenly over N online platforms but early feedback is showing that some are performing better than others, the budgets for the remainder of the campaign might be reallocated to increase the spending for the high performing platforms and decrease the spending for low performing platforms.).

Online advertising often involves humans compiling details for a campaign, including target audience, content, expenditures, and selection of platform. A human marketing manager might determine what should be said in an online advertisement, what keywords to bid on, what targets to approach, and the like. The success of a campaign might be determined by considering additional sales or inquiries that occurred in response to an online ad buy, if such data could be obtained. A limitation of this approach is that online advertising campaigns might not work well if the marketing manager is not skilled in the area or is unaware of the target audiences.

Marketing expenses could be more focused if a computer process could assess the success of an advertising campaign, but it can be hard for a computer to evaluate the many factors that go into the success or failure of an advertising campaign, and which factors matter and which factors do not.

In addition to the difficulty of determining a success or failure of an online advertising campaign, it can be difficult to identify similarity of online advertising campaigns, which would be informative to a machine learning process that would evaluate the likely success or failure of an online advertising campaign based on results for similar online advertising campaigns, giving more weight to more similar online advertising campaigns.

In an embodiment, an online advertising campaign is processed by a campaign evaluator, which can be a computer process, and represented by a campaign dataset. Campaign datasets can be stored in memory and might represent planned future campaign datasets or past campaign datasets, the latter of which might include data elements representing performance of the past campaign.

A campaign dataset might be generated by an automated process, constructed from human input, or a combination thereof. Prior to running a campaign, such as prior to submitting content, instructions, and payment to an online platform, the campaign evaluator might evaluate the campaign dataset and output a targeting value—representing an estimated value of running the campaign represented by the campaign dataset—and a confidence value—representing a machine-determined level of confidence that that the targeting value would correspond to an ultimate campaign value should the campaign be run. For the targeting value, a more general expected quality metric might be used to represent the estimated value of running the campaign represented by the campaign dataset.

In one approach for determining a targeting value for a proposed campaign, the campaign evaluator might extract other campaign datasets from a campaign dataset repository and filter out those other campaign datasets to only further use those campaign datasets that the campaign evaluator determines are similar to the proposed campaign's campaign dataset. Where there is little data from similar campaign datasets and/or few similar campaign datasets, the campaign evaluator might assign a lower confidence value to the proposed campaign dataset. On the other hand, if the campaign evaluator finds many very similar campaign datasets in the repository, and their targeting values are consistent, the campaign evaluator might assign a high confidence value to the proposed campaign. In some embodiments, the high confidence value could mean a high confidence that the proposed campaign would have a high targeting value or could mean a high confidence that the proposed campaign would have a low targeting value. Either way, having that targeting value and that confidence value, the campaign evaluator can use the targeting value and the confidence value to allocate resources. The campaign evaluator might allocate a smaller budget for a campaign with a low targeting value and a larger budget for a campaign with a high targeting value.

The campaign evaluator can process a plurality of campaign datasets to find sets of campaign datasets that share some similarity, to find a targeting of a campaign dataset, perhaps for use in determining whether coverage of different targets is sufficiently provided, and a campaign evaluator can also evaluate a campaign that is ongoing or is proposed, as well as computing confidence values for each of those.

Various steps can be performed for determining a similarity metric between two or more campaign datasets. By generating similarity metrics among campaign datasets, a trained machine learning tool, such as a neural network, can process a campaign dataset to determine various other metrics such as targeting value and a confidence value.

Each campaign dataset can have a quality metric, and a targeting metric, and confidence values for each. Pairs (or sets) of campaign datasets can have a similarity metric between them. A quality metric might be known for each past used campaign dataset, and might be inferred by AI for an as-yet unused campaign datasets based on the quality metrics of past used campaign datasets that are determined to be similar.

In some embodiments, a campaign evaluator is configured to process a campaign dataset to generate two or more split campaign datasets, wherein each of the split campaign datasets represents a subset of the input campaign dataset. By splitting a campaign dataset, they can be processed separately, and campaigns initiated separately, as well as being evaluated separately.

In some embodiments, parts of a campaign dataset are presented in a user interface to a human marketing manager, who might input changes to the campaign dataset. The user interface might connect back to the campaign evaluator to get targeting value changes and confidence value changes from the human marketing manager. The human marketing manager can use this as a training tool or as an optimizer. For example, the human marketing manager might view a targeting value, make an adjustment to one data element of the campaign dataset, request a rerun of the evaluation (or this might be done automatically), view the new targeting value, and learn from that whether that adjustment is good to use.

The human marketing manager can also view the campaign dataset, including its targeting value and its confidence value, and decide whether to emit that campaign dataset to an online advertising platform. As each emission to an online advertising platform could cost the campaigning entity money, the human marketing manager working for the campaigning entity would want to ensure that the money is well-spent, but might not be able to fully determine that. The campaign evaluator might process the campaign dataset to provide the human marketing manager information desired for decision-making, or the campaign evaluator might emit a campaign dataset to an online advertising platform autonomously.

A campaign dataset might include data elements that are not transmitted to the online advertising platform when emitting the campaign dataset.

FIG. 1 illustrates an example of a campaign generation system 100. As illustrated there, data is input to a data input interface 102 by a campaign creator, which could be a human, an artificial intelligence system, or crowdsourced. In some cases, different user interfaces would be provided. Using data input interface 102, a corpus of available content 104, such as topic lists, keyword lists, marketing content, etc. might be available to data input interface 102. An output is a campaign dataset 106 that might comprise campaign content 110, targeting data structure 112, and campaign instructions 114, which might indicate what platforms to use, when to use them, what to buy from them, etc. Campaign dataset 106 might be stored into a campaign store 120 and provided to an input 126 to a campaign executor/evaluator system 122 (shown in greater detail in FIG. 2) that could execute a campaign represented by campaign dataset 106 on an online platform 124 and receive feedback 130. Campaign executor/evaluator system 122 can assess a campaign as well as compare it to other campaigns represented in campaign store 120 and readable over an interface 128. Campaign executor/evaluator system 122 can also assess a campaign while it is running and consider adjustments to a running campaign.

In some scenarios, an advertiser employs data input as campaign instructions 114 to provide information about a campaign the advertiser intends to run, such as the field of business, the offered product or service, the geographical location, target demographics, etc. This may involve processing such information, for example, by parsing and analyzing textual input, analyzing images, analyzing campaign content, etc., and providing other processing such as error detection, correction, etc., as described herein.

In some implementations, all three campaign creator types might be used and each campaign can be processed by a campaign evaluator program to derive an expected quality metric for the campaign's campaign dataset. Each of these campaigns can actually be run, perhaps by executing the instructions of the campaign dataset (e.g., buying advertising opportunities, bidding on advertising slots, submitting advertising content, etc.) and obtaining feedback as to a post-run quality metric.

The quality metrics can be compared before, during, and after a campaign is executed. For example, a campaign management system might consider expected quality metrics for a human-generated campaign, a machine-generated campaign, and a crowd-sourced campaign. The campaign management system might select just the one campaign with the highest expected quality metric and execute that one, or it might provide the lower-scoring creators with information about the highest scoring campaign dataset. For example, should a human marketing manager input details for a first campaign and a machine-learning campaign system generate a second campaign and the campaign management system determines that the expected quality metric of the human-generated campaign is higher than the expected quality metric of the machine-generated campaign, the campaign management system can provide the human-generated campaign and its expected quality metric as a ground truth input to a neural network that might learn patterns of high-scoring campaigns. Later, after a campaign is actually run, a post-run quality metric representing how well the campaign met its targets could be compared to the expected quality metric. That feedback could be used to improve campaigns, and can also be used for training the campaign management system in the way it computes the quality metric for an input campaign dataset.

Figure 2:
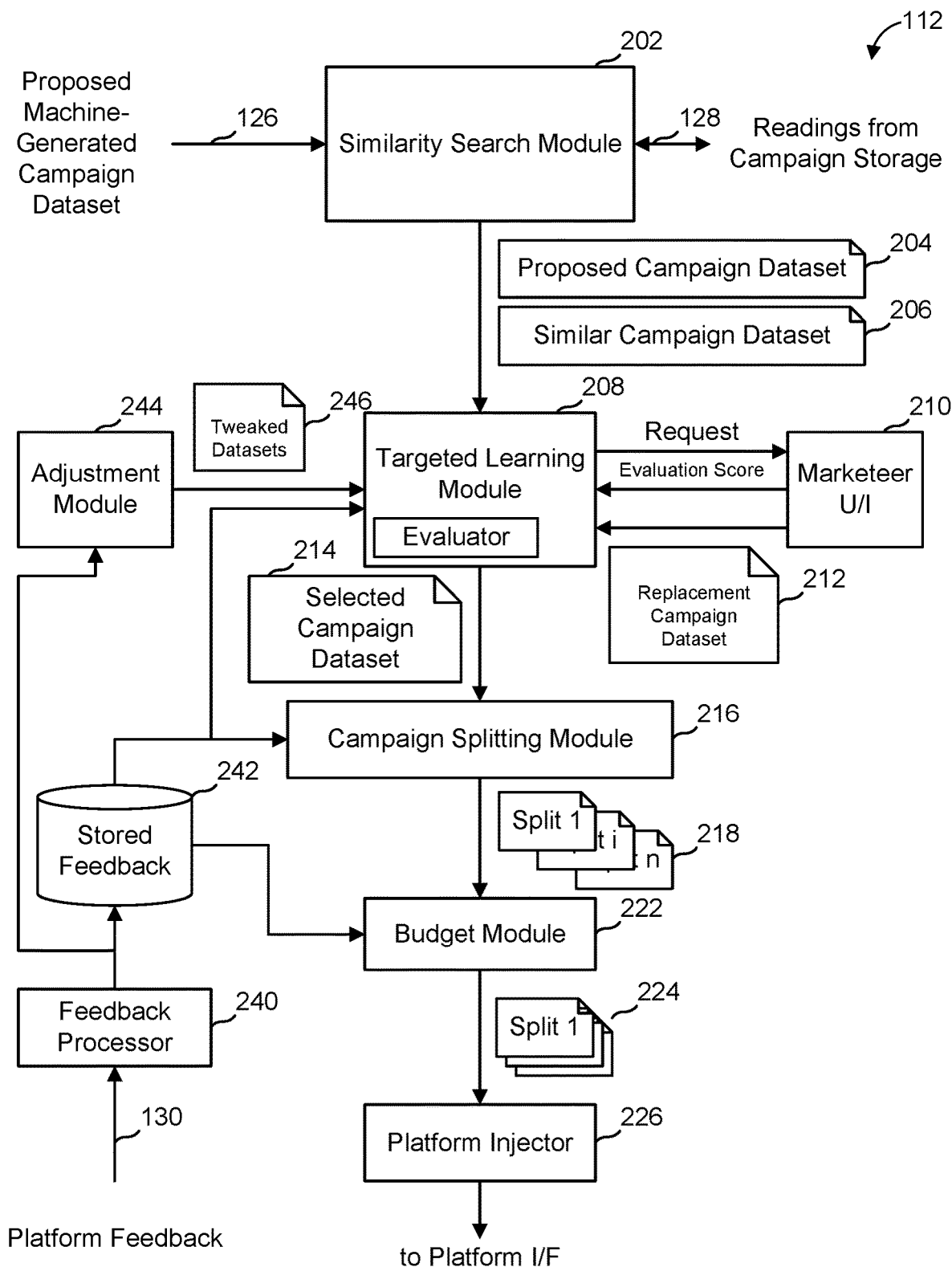
FIG. 2 illustrates campaign executor/evaluator system in greater detail.

FIG. 2 illustrates campaign executor/evaluator system 122 of FIG. 1 in greater detail. Portions of a campaign executor/evaluator system might be used to modify a campaign before execution and/or storing it into a campaign store. A campaign executor/evaluator system might be used to evaluate a campaign after it has been executed or before it has been executed. In some embodiments, a campaign management system has a separate campaign evaluator, a separate campaign executor, and a separate campaign comparator. In some embodiments, the campaign management system might have one campaign evaluator for computing the expected quality metric given a campaign dataset as an input and another campaign evaluator for computing the post-run quality metric given a campaign dataset and feedback information from an online platform or other sources as to how the campaign performed.

As illustrated in FIG. 2, a similarity search module 202 obtains a proposed machine-generated campaign dataset 204 over input 126 and reads in campaign datasets from campaign storage over interface 128 (as well as writing campaign datasets to storage). Perhaps upon first initiation, there are no other campaign datasets and similarity search module 202 proceeds as if there are no similar campaign datasets. Otherwise, similarity search module 202 outputs the proposed machine-generated campaign dataset 204 and a similar campaign dataset 206. Similarity search module 202 might process two or more campaign datasets and determine whether the campaigns they represent are essentially similar despite data differences (e.g., two campaigns that are identical except for one has instructions to spend up to $21 to bid on the advertising keywords "big sale" and the other has instructions to spend up to $22 to bid on the advertising keywords "huge sale" might be considered essentially the same), perhaps using methods described in more detail below. A campaign comparator can be useful in that learning from execution of one similar campaign can be attributed to other similar campaigns. For example, if a campaign to advertise "big sale" had a high expected quality metric yet when executed returned a low post-run quality metric, the expected quality metric for campaign dataset for a "huge sale" campaign might be lowered based on the poor results of execution of the similar campaign.

In one embodiment, similarity search module 202 searches for a number, N, of most similar campaigns from campaign storage or the top N similar campaigns that have an expected quality metric (evaluation score) of at least some threshold value, $T_{sim}$. If similarity search module 202 cannot find similar campaigns that satisfy the thresholding condition, a null campaign dataset might be flagged, which may result in human intervention.

A targeted learning module 208 considers the received datasets and an evaluator determines a confidence score for the proposed machine-generated campaign dataset 204, where a confidence score is higher for more certain campaigns. The targeted learning module 208 might also determine an evaluation score, which can be distinct from a confidence score. Where a confidence score or an evaluation score is low or meets some other criteria, the targeted learning module 208 might make a request to a human marketeer via an interface 210 for an evaluation of the proposed machine-generated campaign dataset 204. The human marketeer might reply with an evaluation score or a replacement campaign dataset 212. For example, when a campaign generation system begins and has no feedback or training, its proposed campaigns might be objectively low quality in the views of the human marketeer. The human marketeer can then propose the replacement campaign, which the campaign generation system could evaluate and learn from.

In some examples, a human marketeer might provide a confidence value assessing their own campaign and a machine learning system might assign an evaluation score to represent its confidence in the marketeer's campaign. In such an implementation, a campaign might be initiated with both humans creating a campaign dataset and machines creating a campaign dataset. One with a higher confidence might be selected for use, or the creator with the lower confidence might be provided with details of the other campaign, to learn from it.

A confidence rating for a campaign dataset might be independent of an expected quality or evaluation metric. For example, a human marketeer might have a low confidence in their own work yet a campaign evaluator program might assess the created campaign dataset as being of a high quality. In the case of a confidence rating from a machine-generated campaign dataset, it might be that the machine's confidence in a campaign is about the same as a machine-generated expected quality metric (e.g., the machine has a greater confidence in a higher quality campaign), but that need not always be the case. A creator can be highly confident that a campaign will perform poorly, for example. Having an expected quality metric that can be independent of a confidence can allow for finer selections such as between human-created campaigns and machine-created campaigns. In a specific example, a campaign management system might identify a human-created campaign with a high confidence value but a low expected quality (and give it a low evaluation score) and a machine-created campaign with a low confidence value and a high expected quality (high evaluation score) that are such that neither should be executed as is, and the campaign management system can present the machine-created campaign to the marketeer for assessment. It may be that a neural network portion of the campaign evaluator (or other machine-learning module) that generated the machine-created campaign dataset encountered many ambiguities that a human marketeer could easily sort out. This might allow the human marketeer to create a new campaign dataset that the creator has a high confidence in and that has a high expected quality metric. Campaign executor/evaluator system 122 might be used for optimization of campaigns, to trigger campaigns, or for other reasons.

Once targeted learning module 208 determines a selected campaign dataset 214, it passes it to a campaign splitting module 216. In some embodiments, passing a campaign dataset might comprise passing a reference to it. Targeted learning module 208 might comprise a campaign evaluator. Targeting learning module 208 might receive a campaign dataset and sample possible sets of targeting options by combining initial parameters and encoded knowledge. Targeting learning module 208 can then generate an evaluation of a campaign dataset before outputting it. For example, the evaluation score of a campaign dataset might be based on feedback results for prior similar campaigns. When initialized, a campaign management system might find that most sampled targeting options do not reach the desired threshold value, and those might be corrected and reevaluated. As campaigns are run, and human inputs are provided, the campaign management system might be able to generate better campaigns.

Campaign splitting module 216 processes a campaign dataset to determine how to split it into multiple subcampaigns 218, or leave it as one campaign. Splitting a campaign into subcampaigns might be based on continuous and discrete properties of campaign like targeting options, budget, etc. If campaign splitting module 216 finds a good split for a campaign, it can output subcampaigns 218 to a budget module 222 that can then provide execution schedules 224 to a platform injector 226 that can execute the campaigns on various platforms.

An execution schedule might indicate visibility of campaigns on desired advertising/marketing platforms. Budget module 222 might assign numerical values to each subcampaign in order to achieve a desired performance.

An evaluator portion of campaign executor/evaluator system 122 can obtain feedback 130 from the online platforms and provide it to a feedback processor 240. Feedback processor 240 might determine what viewing rates and click-through rates are for campaigns based on data from the online platforms. Feedback processor 240 can then store that data to stored feedback 242 for later use by other modules when evaluating future campaigns, splitting, and/or budgets.

Feedback processor 240 might also provide feedback for particular campaigns to an adjustment module 244. Adjustment module 244 might generate tweaked datasets 246 from a campaign and the feedback for that campaign, which can occur while a campaign is still running. For example, if adjustment module 244 determines that performance of an on-going campaign is not good enough, it can generate variations of the on-going campaign and push those to targeted learning module 208 which can do evaluations of those variations. Highly evaluated tweaked campaigns can then be injected in place of the on-going campaign.

Many of these modules in FIG. 2 can operate without requiring human intervention or can operate with human intervention as needed and learn from the human intervention.

Figure 3:
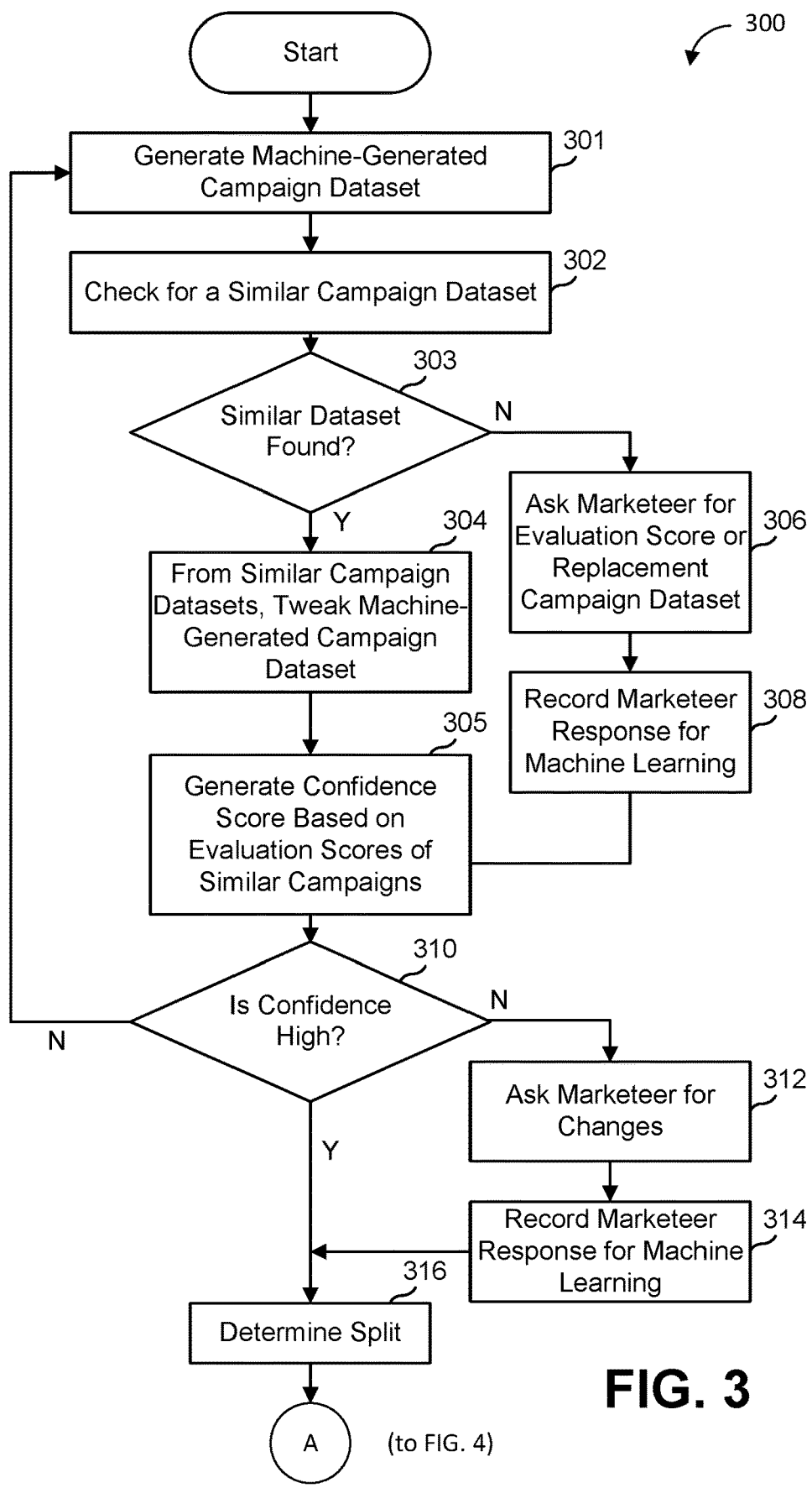
FIG. 3 is a flowchart of a process of campaign creation and injection.

FIG. 3 is a flowchart of an example process 300 that might be performed for autonomously generating campaigns. In step 301, a campaign management system, typically implemented using a processor and connected memory and interfaces, generates a machine-generated campaign dataset and at step 302, checks for a similar campaign dataset to be used in assessing an evaluation score for the machine-generated campaign dataset. In one approach, assessing an evaluation score for the machine-generated campaign dataset comprises finding results of the similar campaign dataset. In some embodiments, the machine-generated campaign dataset is generated by an artificial intelligence, human input, or a combination thereof.

If similar campaign dataset is found at step 303, the process continues at step 304, where the machine-generated campaign dataset might be tweaked based on the similar campaign dataset(s) found. As an example, data from the similar datasets having high evaluation scores, such as their targeting options, etc. might be used to adjust the machine-generated campaign dataset. Then, at step 305, a confidence score of the machine-generated campaign dataset is determined based on evaluation scores of similar campaigns and the process continues at decision step 310.

If no similar campaign dataset is found at step 303, the process moves to step 306, where the campaign management system prompts a human marketeer for an evaluation score of the machine-generated campaign dataset or a replacement campaign dataset. At step 308, the marketeer response is recorded for machine learning and the process moves to decision step 310.

At decision step 310, a confidence score for the machine-generated campaign dataset is determined, or an evaluation score for the replacement campaign dataset if that path was taken, and if it is high enough, or meets some predetermined criteria, the process continues at step 316. Otherwise, the process might flow to step 312, where the marketeer is prompted for changes to the campaign dataset and step 314, where the system records marketeer responses for machine learning and then continues to step 316. The process might instead flow back to step 301 to start over.

Figure 4:
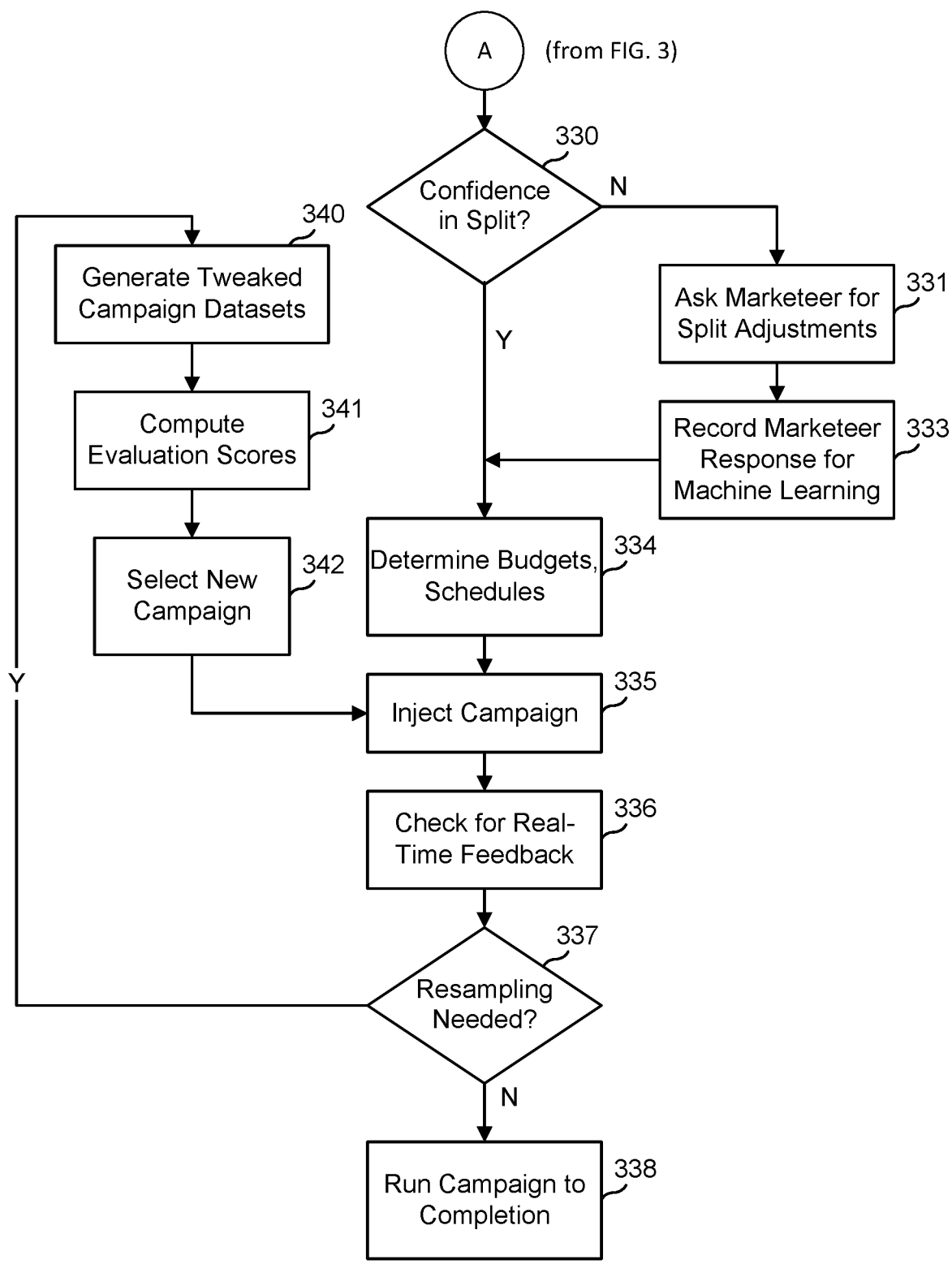
FIG. 4 is a flowchart that continues the process of FIG. 3.

At step 316, a determination is made whether to split a campaign into subcampaigns, which might be done so that each subcampaign can run on a distinct platform. As shown in the continuation of the process in FIG. 4, once subcampaigns are generated, at step 330, a confidence metric in the split is done and if it is not high enough, the campaign management system will, at step 331, prompt a marketeer for split adjustments, and at step 333, record the marketeer response for machine learning. In either case, the process continues at step 334, where the campaign management system determines budgets and schedules, and at step 335, injects the campaign to the online platform(s).

The campaign management system checks, at step 336, for real-time feedback and tests, at step 337, whether resampling is needed. If not, the campaign runs to completion (step 338). If resampling is needed, the campaign management system can (at step 340), generate tweaked campaign datasets, compute evaluation scores (step 341), and select a new campaign (step 342), which can then be injected back at step 335.

In the systems and methods shown in FIGS. 1-4, a campaign executor/evaluator might include a campaign comparator to compare two or more campaign datasets to determine a degree of similarity among them. This can be useful in cases where information learned about one campaign can be attributed to similar campaigns. Campaign comparison can determine similarity between campaigns by examining most important features of campaigns and storing similarities as part of the corresponding campaign datasets or separately as comparison datasets, which can be used for future optimization steps. Comparisons might consider specific data elements of a campaign dataset, such as a data field indicative of a campaign's target language(s), location(s), gender(s), age range(s), device types, products/services, demographics, etc. Thus, a useful capability is an ability to read in two (or more) campaign datasets and programmatically determine a similarity between them. One such set of methods will now be described.

A number of the data elements might be enumerated values, such as one or more selections from among a finite set of selections. Herein, such selections might be described as selecting a feature, $f_x$, from a set, $S_x$, and the sets might be dictated by what sets are used by the online platforms (such as a pay-per-click online advertising platform that allows for purchase of advertising slots directed to users in specific categories from an enumerated set of categories).

Examples of such selectable features that might be represented by data in the campaign dataset might include languages (languages of the potential customers a campaign would like to reach; selecting $f_{languages}$ from among set $S_{language}$ that might correspond to all possible language values that the online platforms accept), locations (of the potential customers a campaign would like to reach; selecting $f_{locations}$ from among the set $S_{locations}$ that might correspond to all possible location values that the online platforms accept), genders (genders of the potential customers a campaign would like to reach; selecting $f_{genders}$ from among set $S_{genders}$ that might correspond to all possible gender values that the online platforms accept), age ranges (of the potential customers a campaign would like to reach; selecting $f_{ages}$ from among set $S_{ages}$ that might correspond to all possible age range values that the online platforms accept), and similarly for targeted devices ($f_{devices}$ selected from the set $S_{devices}$) and products/services ($f_{product}$ selected from the set of perhaps arbitrary text that clearly defines a product or a service, or an enumerated set $S_{products}$.

A campaign evaluator might determine which features have what impact on campaign performance. In some examples, certain features have higher contribution then others, so a campaign comparator might weight those certain features more highly when determining similarity, perhaps as a weighted average of individual feature similarities between two campaign datasets, $c_1$ and $c_2$, as in Equation 1, where $w_i$ denotes importance of each feature on the campaign performance and sim $(f_i^{c1}, f_i^{c2})$ denotes a similarity computation of its feature.

$$sim(c_1, c_2) = \frac{\sum_{i=1}^{n} sim(f_i^{c1}, f_i^{c2}) * W_i}{\sum_{i=1}^{n} W_i} \quad \text{(Eqn. 1)}$$

Where an online platform only allows a finite set of feature values, a Jaccard coefficient could be used as a measure for similarity. In an example, a campaign might be limited to enumerated values for $f_{languages}$, $f_{genders}$, $f_{ages}$, $f_{devices}$. Equation 2 illustrates an example computation that might be performed.

$$\text{jaccard}(f_i^{c1}, f_i^{c2}), = \frac{|f_i^{c1} \cap f_i^{c2}|}{|f_i^{c1} \cup f_i^{c2}|} \quad \text{(Eqn. 2)}$$

Locations on an online platform might be enumerated or might be represented by coordinates. Where they are enumerated, they can be part of the Jaccard coefficient, but in other cases, they might be represented as coordinates, such as in a geographical coordinate system, perhaps translated from a textual description. Similarity of two campaign datasets by their location features might be computed as in Equation 3, where $f_{location}^{c1}{}_i$ is a location of one campaign and $f_{location}^{c2}{}_i$ is a location of another campaign and the dis( ) function might be as defined as in Equation 4.

$$\frac{\sum_{i=1}^{n} dis(f_{location_1}^{c1}, f_{location}^{c2})}{N} \quad \text{(Eqn. 3)}$$

$$dis(f_{location_1}^{c1}, f_{location}^{c2}) \frac{1}{\sum_{i=1}^{n} harvesine(f_{location_1}^{c1}, f_{location_k}^{c2})} \quad \text{(Eqn. 4)}$$

In Equation 4, the harvesine( ) distance function might be as shown in Equation 5, where r is Earth radius, $\varphi_1$ and $\varphi_2$ are latitudes of locations $f_{location}^{c1}{}_i$ and $f_{location}^{c1}{}_i$, respectively and $\lambda_1$ and $\lambda_2$ are longitudes of locations $f_{location}^{c1}{}_i$ and $f_{location}^{c1}{}_i$, respectively.

$$harvesine(f_{location_i}^{c1}, f_{location_k}^{c2}) + \quad \text{(Eqn. 5)}$$
$$2r \arcsin\left(\sqrt{\sin^2\left(\frac{\phi_2 - \phi_1}{2}\right) + \cos\phi_1\cos\phi_2 \sin^2\left(\frac{\lambda_2 - \lambda_1}{2}\right)}\right)$$

The location similarity metric (and other metrics) might be normalized to be between 0 and 1.

Where products and services in a campaign dataset can be any arbitrary text, the input space is extremely large and very sparse. To assess similarity, a campaign comparator might have, or construct, a stored taxonomy of products and services such that it covers most or all possible business cases. Product/service inputs can then be classified as one or more vertices in the product/service taxonomy and that can be used to compute product similarity.

Figure 5:
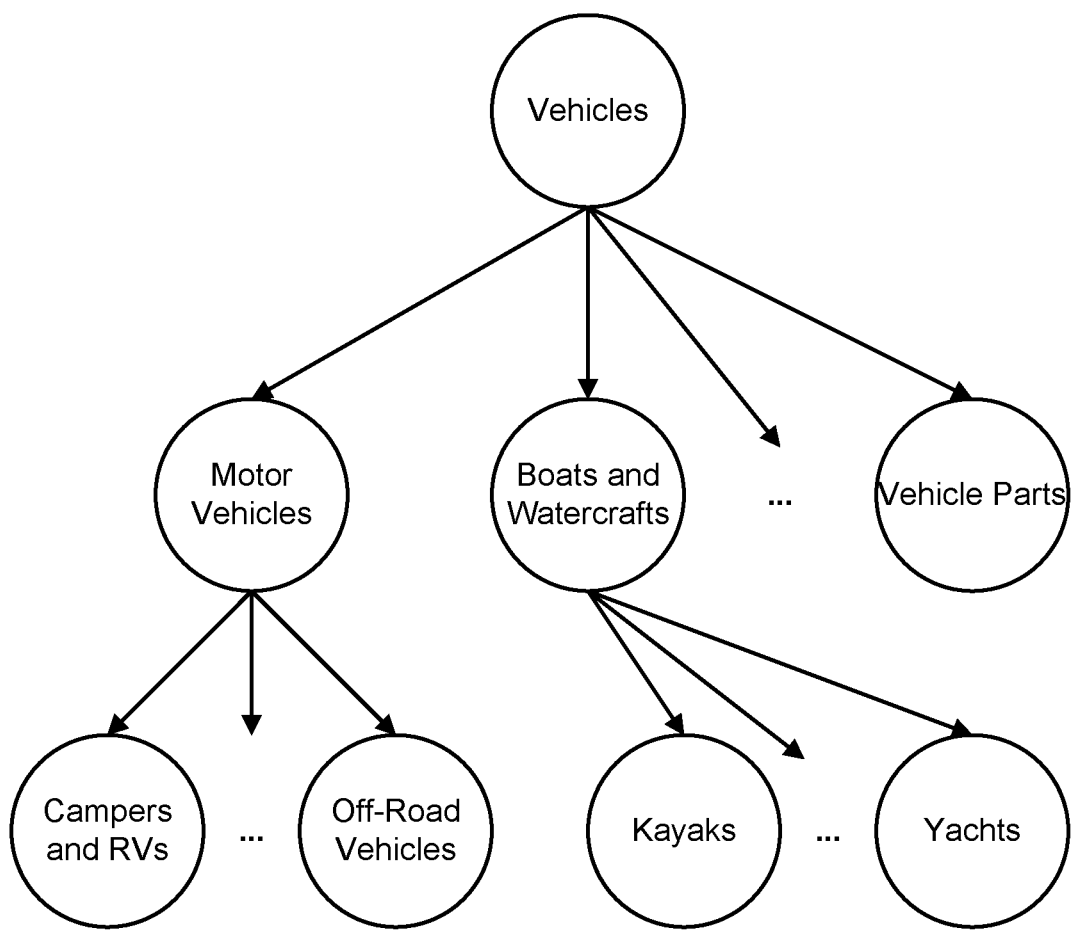
FIG. 5 illustrates an example taxonomy.
Figure 6:
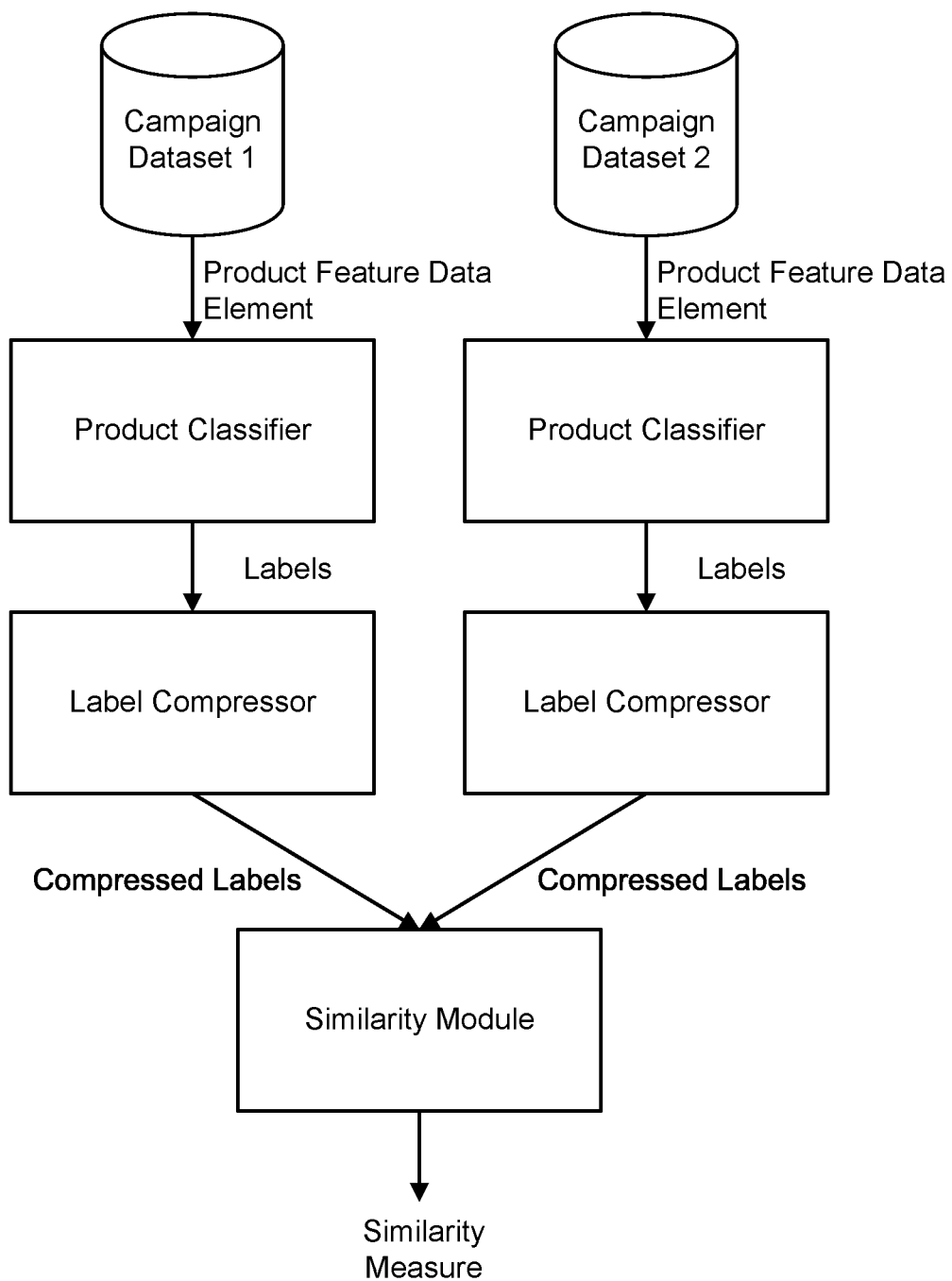
FIG. 6 illustrates modules of a campaign comparator.

FIG. 5 illustrates an example taxonomy. FIG. 6 illustrates modules of a campaign comparator. The taxonomy can be representable as a directed acyclic graph (DAG) or other data structure, wherein each vertex node, w, represents a product or a service category, and each directed edge, w–>v, represents that w is a contextual generalization (e.g., hypernym, etc.) of v. In order to match an inputted product or service to graph nodes, a product classifier might be used to classify the product/service. The product might take raw input text that describes a product/service and estimate to which labels in the product taxonomy the product belongs. Classification can be expressed as a multilabel classification problem, wherein given a label space $L^{products}$, a text sequence x containing n words is assigned to a subset, y*, containing labels from the label set $L^{products}$ to x. The campaign comparator might be programmed to casted this operation as an optimal label sequence prediction that maximizes P((y|x) as in Equation 6, where $P(y_i|y_1, \ldots, y_{i-1}, x)$ can be a softmax function over all labels in the set $L^{products}$.

$$P(y|x) = \Pi_{i=1}^{N} P(y_i|y_1, \ldots, y_{i-1}, x) \quad \text{(Eqn. 6)}$$

This might also be implemented as a neural network with softmax as an output layer. A different approach might be used, such as single label classification where from an output of a single classification, a top N predicted labels are taken and assigned to input text x, etc. The product classificator might be an internal or an external service of a system and for the inputs shown in Table 1 might provide the classifications shown in Table 1.

TABLE 1

| Input Product/Service | Classification(s) |
| --- | --- |
| morning | Fitness Classes and Instruction, Sports Instruction and Coaching, Fitness, Beauty and Personal Care, Yoga and Pilates, Sports and Fitness |
| yoga | |
| cr7 | Sports News and Media, Sports, Soccer, Celebrities and Entertainment News, News, Media and Publications, Arts and Entertainment, Sports and Fitness |
| Solar Panels | Public Services, Law and Government, Business and Industrial, Energy Industry, Public Utilities, Solar Panels, Solar Power, Renewable and Alternative Energy |
| leichte turnschuhe | Camping and Outdoor Recreation, Footwear, Boots, Sports and Fitness Apparel, Apparel, Hiking Boots, Hiking, Athletic Shoes, Sports and Fitness, Hobbies and Leisure |

After classifying products to appropriate nodes, the campaign comparator then compresses the labels to narrow a classification result if there exist nodes that are on a similar graph path. A final result of compression might contain nodes with a highest depth in the tree.

FIG. 7 illustrates a process for computing label compression. Table 2 illustrates results of compression of the labels of Table 1.

TABLE 2

| Classified Labels | Compressed Labels |
| --- | --- |
| Fitness Classes and Instruction → Sports Instruction and Coaching | Sports Instruction and Coaching |
| Sports and Fitness → Fitness → Yoga and Pilates | Yoga and Pilates |

The campaign comparator might create a computed feature, $f_{productsLabels}$, that is associated with a campaign dataset or stored therein. This computed feature might be determined from the compressed labels. With that, the campaign comparator might compute an average product similarity between two campaigns as in Equation 7, wherein the sim( ) function is defined as in Equation 8.

$$\frac{\sum_{i=1}^{n} sim(f_{productsLabels_i}^{c1}, f_{productsLabels}^{c2})}{N} \quad \text{(Eqn. 7)}$$

$$sim(f_{products_i}^{c1}, f_{products}^{c2}) = \quad \text{(Eqn. 8)}$$
$$\frac{\sum_{i=1}^{n} WuPalmer(f_{products\ Labels_i}^{c1}, f_{products\ Labels_k}^{c2})}{N}$$

The WuPalmer( ) similarity function of Equation 8 might be as shown in Equation 9.

$$WuPalmer(f^{c1}_{productsLabels_i}, f^{c2}_{productsLabels_k}) = \qquad \text{(Eqn. 9)}$$

$$\frac{2 * \text{depth}\left(lowestCommonParent(f^{c1}_{product\ Labels_i}, f^{c2}_{product\ Labels_k})\right)}{\text{depth}(f^{c1}_{product\ Labels_i}) + \text{depth}(f^{c2}_{product\ Labels_k})}$$

To determine whether there are sufficiently similar campaign datasets, a campaign comparator might pick a top N similar campaigns where $sim(c_1, c_2)$—the similarity function value between two campaign datasets, $c_1$ and $c_2$—is greater than or equal to some pre-determined threshold, such as $T_{sim}$. The campaign comparator might provide a dissimilar campaign dataset to a marketing manager to review and/or edit.

One part of optimizing a campaign dataset can be to perform a co-targeting analysis and modify the campaign dataset accordingly. The co-targeting analysis might use relations between targeting options, product labels and campaigns. For example, a campaign dataset, C, might have a feature $f_{productsLabels}$ selected from the set $S_{products/services}$ that is constructed with node values of a taxonomy graph as described herein. Each product/service in set $S_{products/services}$ can have one or more targeting options, $t_{product/service}$, assigned to it with associated distribution parameters, $\theta_t^{product/service}$. In some embodiments, the associated distribution parameters $\theta_t^{product/service}$ represent beta distribution parameters, but in other embodiments, they can be a gamma distribution, neural network parameters, etc.

A targeted learning module samples best targeting options for an inputted campaign dataset, as might be performed by targeted learning module 208 shown in FIG. 2. There might be two cases: (1) where the module is parameterized with existing most similar campaigns, and (2) where the module is parameterized with marketeer input. An overview of a sampling process and related data structures is shown in FIG. 8.

Figure 8:
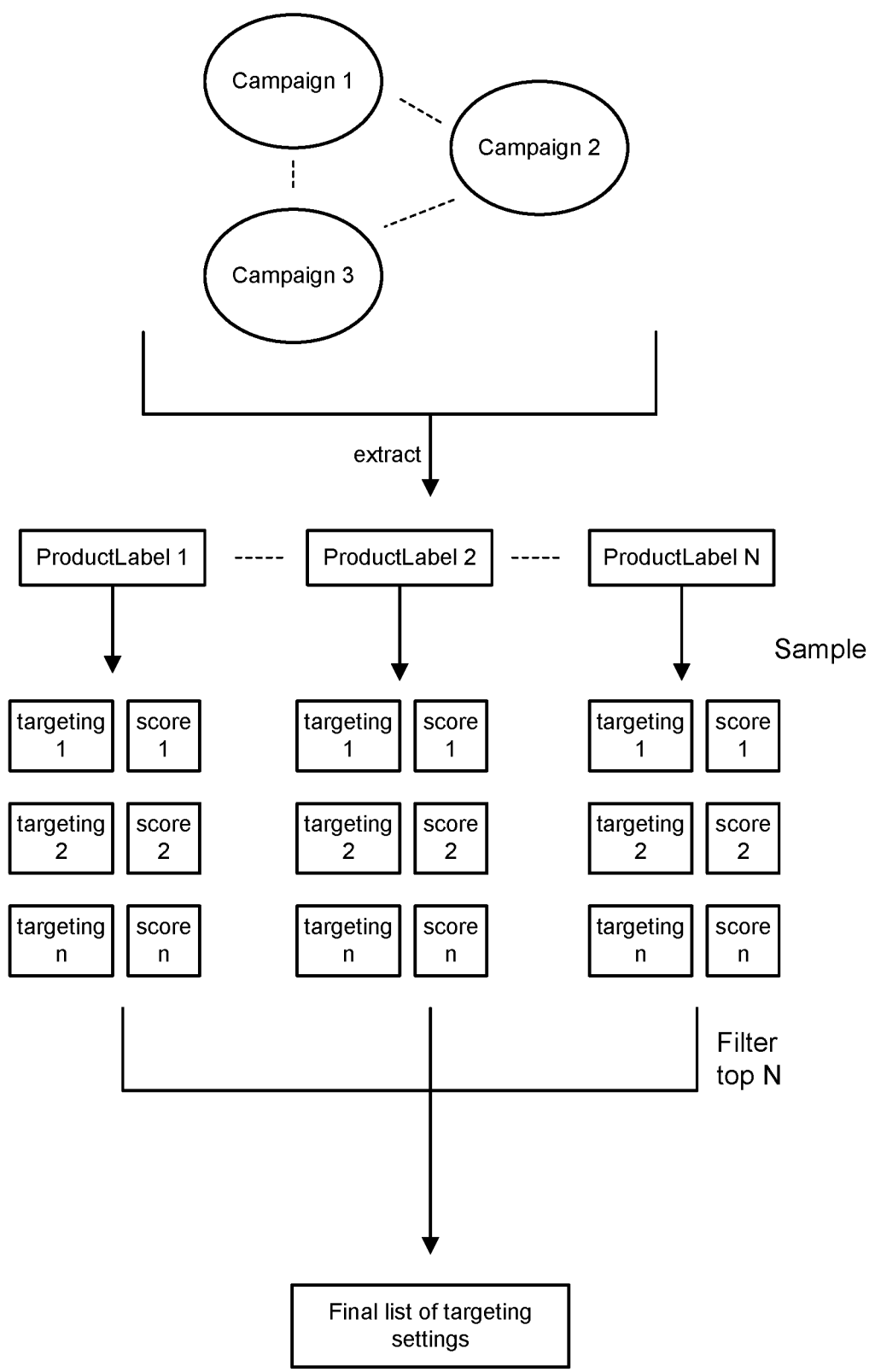
FIG. 8 illustrates a sampling process and related data structures.

In a process described in FIG. 8 and herein, for a module parameterized with existing campaigns, a targeting sample module might extract feature data $f_{productsLabels}$ from those closest campaigns. Then, the module associates targeting options from extracted product labels and samples targeting option scores from distribution parameters, $DP=\theta_t^{product/service}$, that are assigned to each targeting option of each extracted product label. In one embodiment, the targeting score is as defined by a posterior probability as in Equation 10, where x denotes an advertising context (a campaign, etc.), $DP=\theta_t^{product/service}$ are distribution parameters, t is a current targeting option, and P(selected=1|DP, x, targeting) is likelihood function corresponding to a probability that targeting option would be selected by a professional marketeer and P(DP) represents a prior distribution.

$$\text{score}\left(t_{\frac{product}{service}}\right) = P\left(\text{selected} = 1 \mid DP, x, t_{\frac{product}{service}}\right) P(DP) \qquad \text{(Eqn. 10)}$$

The module might select a top N targeting options with highest scores and from them form an evaluation set $S_{targeting}^{evaluation}$ and pass it to the evaluator or targeted learning module 208. Preferably, information about uncertainty together with predicted targeting options is considered so that the system does not predict and place uncertain targeting options for a campaign. This can be done by the evaluator or targeted learning module 208, which can run targeting options in evaluation set $S_{targeting}^{evaluation}$ through the test represented in Equation 11, where $C_D$ stands for a confidence interval, $\text{score}(t_{product/service})$ is a sampling distribution and $M_{best}^{confidence}$ represents a confidence of a best marketeer for that campaign.

$$\max(P(\theta_t^{product/service} \in C_D | \text{score}(t_{product/service})), \\ M_{best}^{confidence}) \qquad \text{(Eqn. 11)}$$

A machine confidence might be represented by $P(\theta_{tproduct/service} \in C_D | \text{score}(t_{product/service}))$. Where the machine confidence is higher than the marketeer confidence, the evaluator or targeted learning module 208 might represent the values as $V_{machine}$, but if marketeer confidence is higher, then the targeting option would be $V_{marketeer}$.

If more than $T_{confident}\%$ of targeting options from $S_{targetingevaluation}$ are labeled as $V_{machine}$, the machine-created campaign dataset might be queued for execution, otherwise it might be presented to a marketeer for evaluation.

If a check fails, the targeting option is passed to a marketeer for additional evaluation. Once a marketeer provides feedback, $\theta_t^{product/service}$ and targeting option parameters $\theta_t^{product/service}$ are updated according to the feedback.

In the second case, wherein the module is parameterized with marketeer input and there are no similar campaigns, marketeer interaction can be sought. For a given campaign, a marketeer assigns initial targeting options for each product label that a campaign has assign to it. Upon initialization of targeting options, distribution parameters $\theta_t^{product/service}$ are assigned to initial values. Targeting options assigned by the marketeer do not need to go through the decision module, but can be recorded as part of the campaign dataset.

FIG. 9 illustrates an example process for parameterizing targeting options. Each campaign dataset might have a data feature defining a campaign time span and feedback might be obtained during that time span, in the form a reward measures. A reward measure might represent a true measure of success for a targeting option, an as it might be a function of time, a reward measure, $r_t$, is that value for a time, t. For each targeting option, the module might observe rewards and update parameters of a distribution associated with targeting option.

Figure 10:
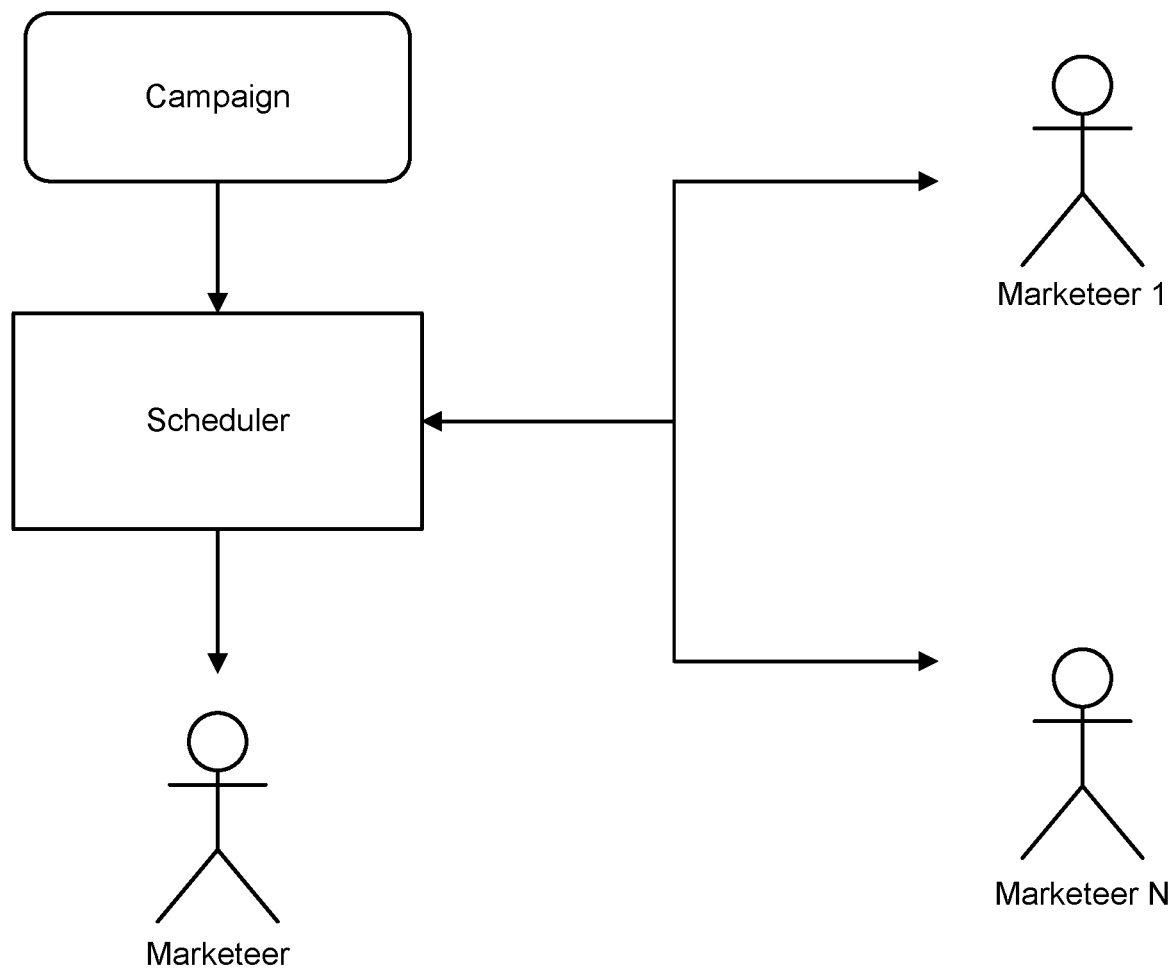
FIG. 10 illustrates a process for a marketeer scheduler.

In using human marketeers, they might be automatically scheduled by a marketeer scheduling module. The marketeer scheduling module assigns campaigns to an optimal available marketeer at certain time, perhaps based on evaluation of marketeers for given campaigns. This can be modeled by an expectation of campaign rewards and expectation of campaign cost if a certain marketeer takes a campaign. FIG. 10 illustrates a process for a marketeer scheduler and FIG. 11 illustrates a process for marketeer scheduling.

The process might start by fetching available marketeers at a current moment. A next step is to assign a score for each of the available marketeers based on similar campaigns of the marketeer to a current campaign and then compute a score for each marketeer. A score might be computed as in Equations 12-15, where $M_c$ is an expectation of a campaign cost if the marketeer takes it conditioned on a current campaign and similar campaigns of the marketeer to the current campaign, $M_r$ is an expectation of a campaign reward if that marketeer takes it, conditioned on a current campaign and similar campaigns of the marketeer to the current campaign, and the confidence of marketeer is given as in Equation 15.

$$M_{score} = \frac{M_c}{M_r} \qquad \text{(Eqn. 12)}$$

-continued $$M_c = E(C_c \mid C_{Mclosest}, C) \quad \text{(Eqn. 13)}$$

$$M_r = E(C_r \mid C_{Mclosest}, C) \quad \text{(Eqn. 14)}$$

$$P(\theta M_c \in C_D, \theta C_D \in CD \mid M_c, M_r) \quad \text{(Eqn. 15)}$$

The process might start by fetching available marketeers at a current moment. A next step is to assign a score for each of the available marketeers based on similar campaigns of the marketeer to a current campaign and then compute a score for each marketeer. A score might be computed as in Equations 12-15, where $M_c$ is an expectation of a campaign cost if the marketeer takes it conditioned on a current campaign and similar campaigns of the marketeer to the current campaign, $M_r$ is an expectation of a campaign reward if that marketeer takes it, conditioned on a current campaign and similar campaigns of the marketeer to the current campaign, and the confidence of marketeer is given as in Equation 15.

A budget module can process a campaign dataset to identify and parse campaign instructions to comply with budgeting constraints. Consider an advertiser, A, with a campaign divided into K different platforms (or targeting groups, or more generally, arms), with K≥2. An overall budget B is to be spent during the duration of the campaign. There are T dividing rounds (until A has budget left) with constant defined gap (hour, day, week, etc.) between each round. At the end of the division round t, advertiser A receives rewards for each platform, a reward for platform k at round t is annotated as $r_{k,t}$, and cost which $c_{k,t}$ for each platform. The values $r_{k,t}$ and $c_{k,t}$ are bounded to $[0,\infty>$. Dividing rounds are annotated with t, at each round t advertiser allocates proportion $w_{k,t}$ of an available budget at round t to each campaign K, as in $b_{k,t}=w_{k,t}*B_t$, and $w_{k,t} \in [0,1]$, as in Equation 16, where $b_{k,t}$ is the allocated budget for campaign k at round t, $w_{k,t}$ is the proportion of a budget for campaign k at round t, and $B_t$ is budget at round t.

$$\Sigma_{k=1}^{K} w_{k,t}=1,$$

$$\Sigma_{k=1}^{K} b_{k,t} \leq B_t, \quad \text{(Eqn. 16)}$$

An advertiser might want to maximize a sum of rewards over time and over platforms, such that Equation 17 is satisfied.

$$\Sigma_{k=1}^{K} w_{k,t}=1, \Sigma_{k=1}^{K} b_{k,t} \leq B_t, \quad \text{(Eqn. 17)}$$

With Thompson sampling, a module can start with prior distributions of the rewards which get updated to more and more accurate posterior distributions as data from the online platform comes in about rewards. Updating the posterior distribution continuously adds information about the true unknown reward parameter. Distribution of rewards for a platform are annotated as $\Gamma_k$. With Thompson sampling with included cost, the module starts with prior distributions of the rewards and costs which get updated to more and more accurate posterior distributions as data arrives and updating the posterior distribution continuously adds information about the true unknown reward parameter and cost parameter. In FIGS. 12-16, the distribution of rewards for a platform are annotated as $\Gamma^{reward}_k$ and costs as $\Gamma^{cost}_k$.

Figure 17:
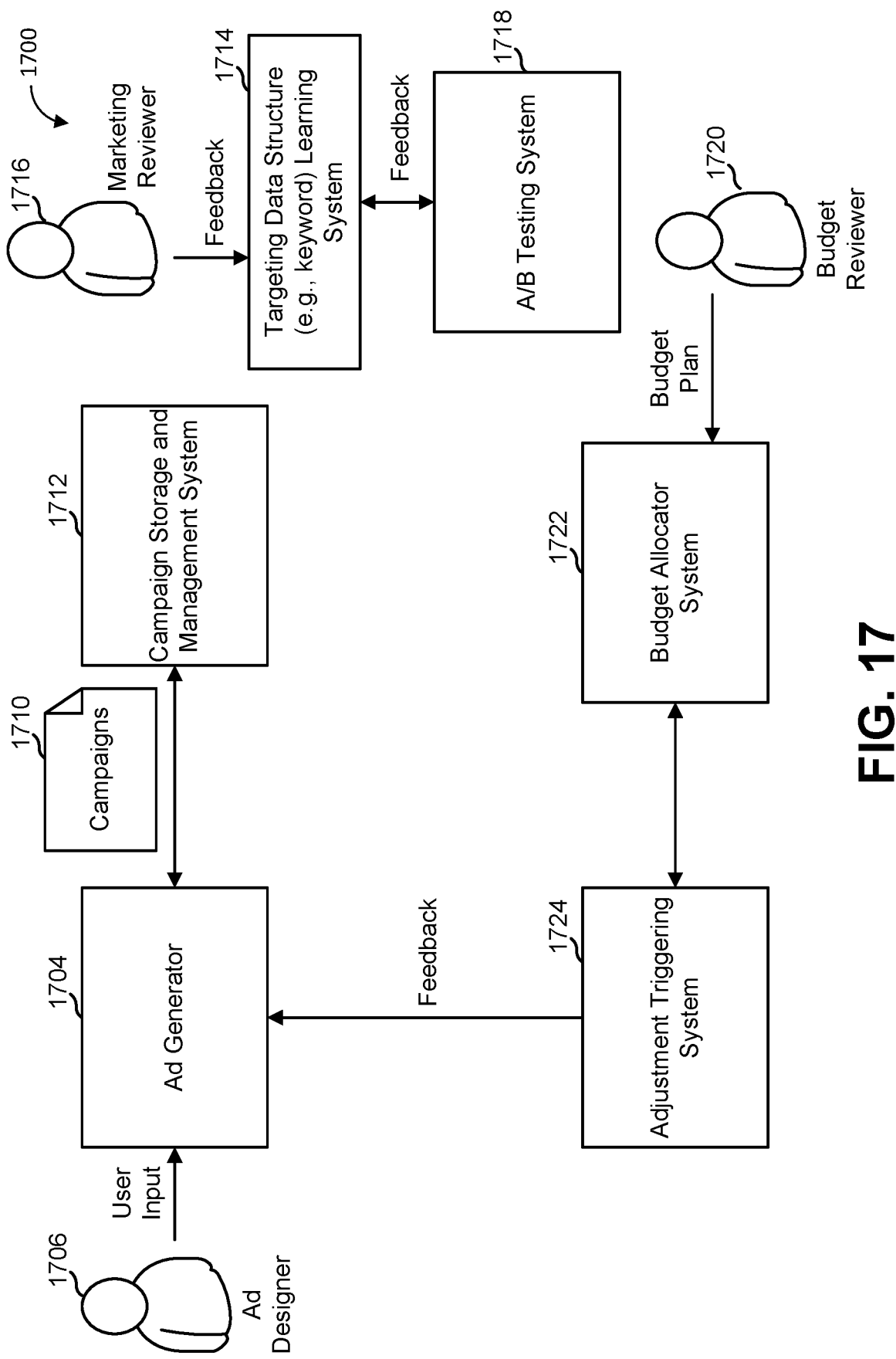
FIG. 17 is a block diagram of various components, including inputs from human users and computer processes.

FIG. 17 is a block diagram 1700 of various components, including inputs from human users and computer processes. As shown there, and advertisement designer 1706 might provide user input to an ad generator 1704. The ad generator 1704 could generate campaign data 1710 that can be passed to a campaign storage and management system 1712. The ad generator 1704 can also pull in campaign data previously stored.

A marketing reviewer 1716 can provide feedback to a targeting data structure learning system 1714 that can get feedback also from an A/B testing system 1718. A budget reviewer 1720 can submit a budget plan to a budget allocator system 1722, that interacts with an adjustment triggering system 1724, which can in turn provide feedback to the ad generator 1704.

Figure 18:
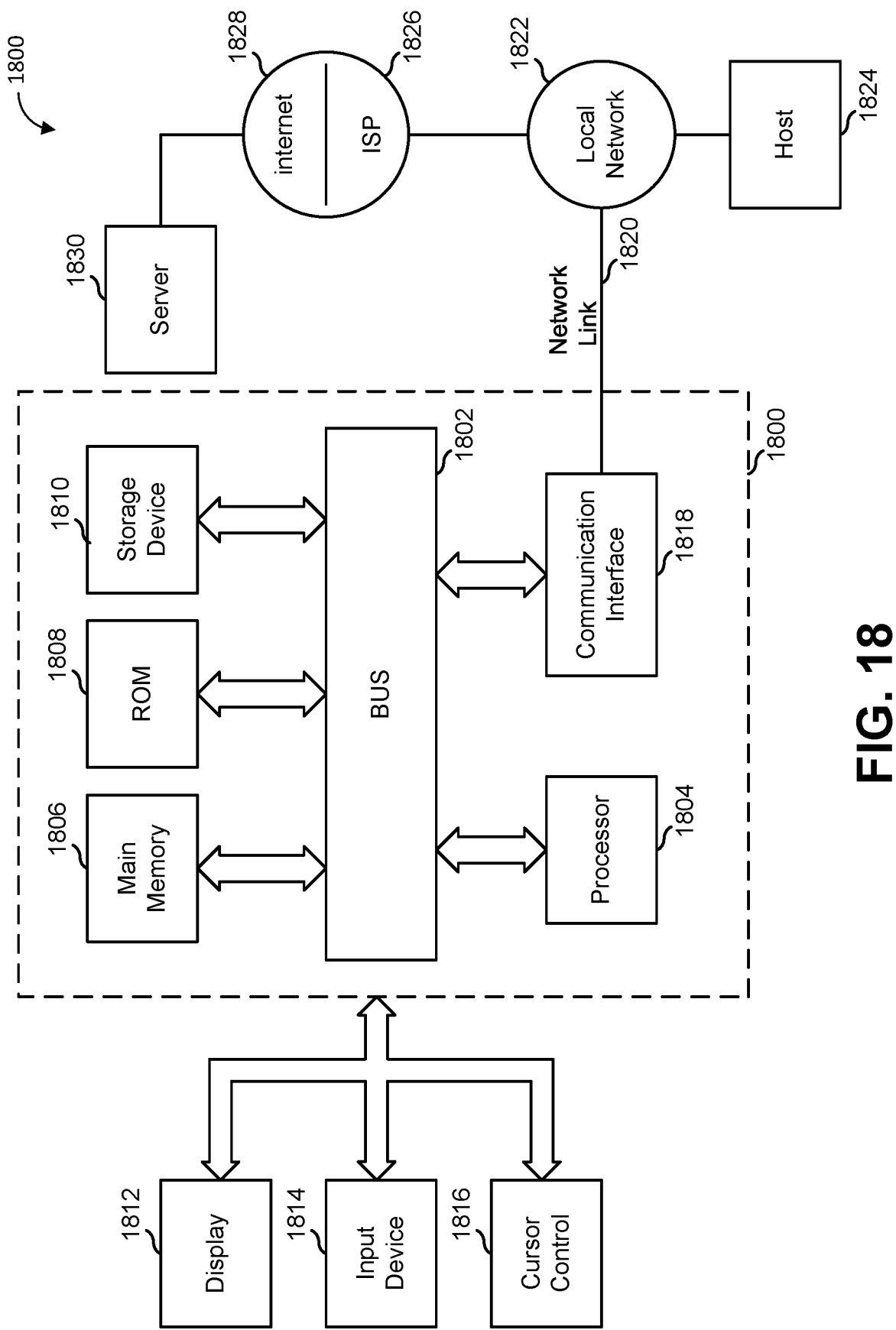
FIG. 18 is a block diagram that illustrates a computer system upon which an embodiment of the invention may be implemented.

FIG. 18 is a block diagram that illustrates a computer system 1800 upon which an embodiment of the invention may be implemented. Computer system 1800 includes a bus 1802 or other communication mechanism for communicating information, and a processor 1804 coupled with bus 1802 for processing information. Processor 1804 may be, for example, a general-purpose microprocessor.

Computer system 1800 also includes a main memory 1806, such as a random-access memory (RAM) or other dynamic storage device, coupled to bus 1802 for storing information and instructions to be executed by processor 1804. Main memory 1806 also may be used for storing temporary variables or other intermediate information during execution of instructions to be executed by processor 1804. Such instructions, when stored in non-transitory storage media accessible to processor 1804, render computer system 1800 into a special-purpose machine that is customized to perform the operations specified in the instructions.

Computer system 1800 further includes a read only memory (ROM) 1808 or other static storage device coupled to bus 1802 for storing static information and instructions for processor 1804. A storage device 1810, such as a magnetic disk or optical disk, is provided and coupled to bus 1802 for storing information and instructions.

Computer system 1800 may be coupled via bus 1802 to a display 1812, such as a computer monitor, for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane.

Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor 1804 executing one or more sequences of one or more instructions contained in main memory 1806. Such instructions may be read into main memory 1806 from another storage medium, such as storage device 1810. Execution of the sequences of instructions contained in main memory 1806 causes processor 1804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1810. Volatile media includes dynamic memory, such as main memory 1806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and send the instructions over a network connection. A modem or network interface local to computer system 1800 can receive the data. Bus 1802 carries the data to main memory 1806, from which processor 1804 retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818. The received code may be executed by processor 1804 as it is received, and/or stored in storage device 1810, or other non-volatile storage for later execution.

Figure 19:
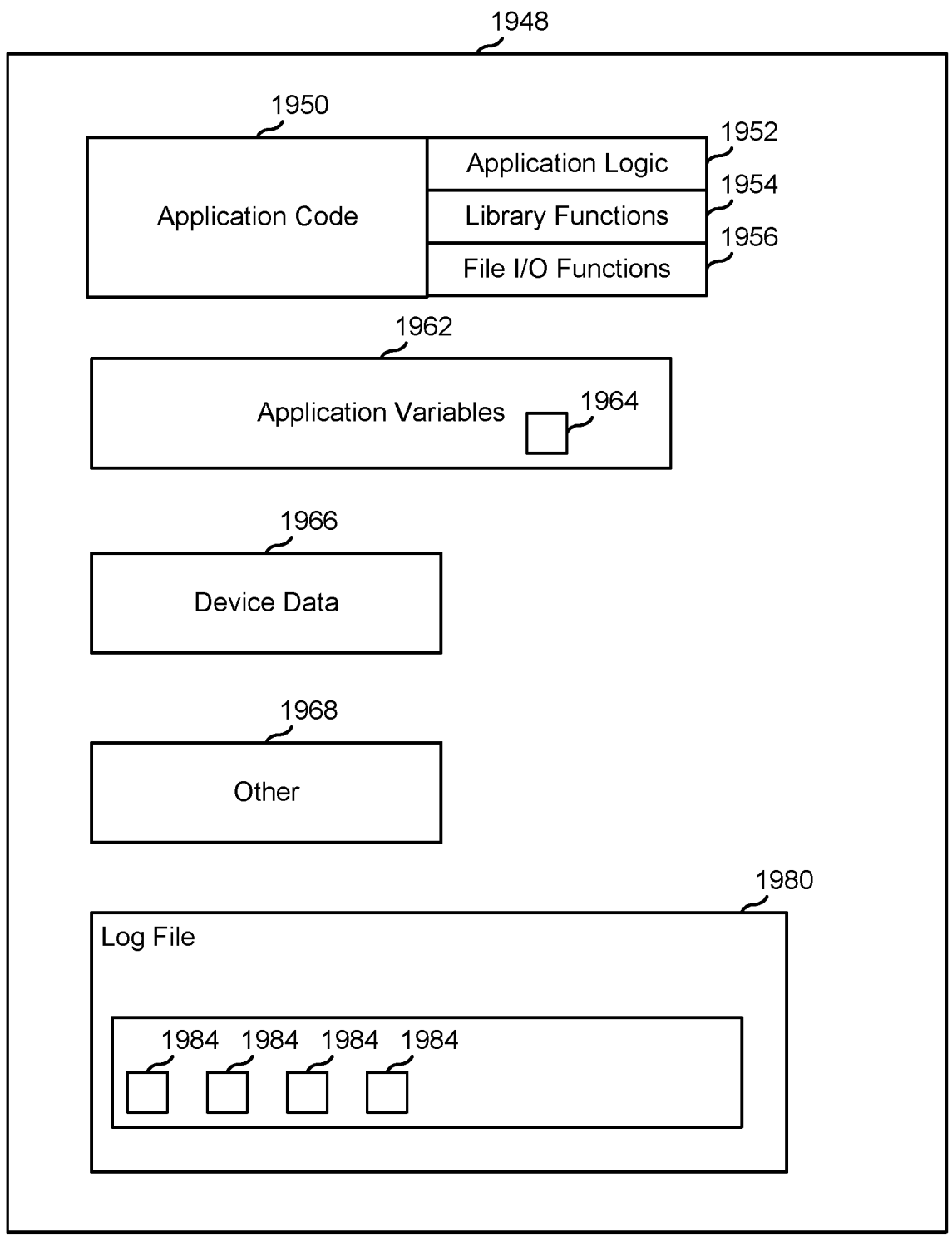
FIG. 19 illustrates an example of memory elements that might be used by a processor to implement elements of the embodiments described herein.

FIG. 19 illustrates an example of memory elements that might be used by a processor to implement elements of the embodiments described herein. For example, where a functional block is referenced, it might be implemented as program code stored in memory. FIG. 19 is a simplified functional block diagram of a storage device 1948 having an application that can be accessed and executed by a processor in a computer system. The application can one or more of the applications described herein, running on servers, clients or other platforms or devices and might represent memory of one of the clients and/or servers illustrated elsewhere. Storage device 1948 can be one or more memory devices that can be accessed by a processor and storage device 1948 can have stored thereon application code 1950 that can be configured to store one or more processor readable instructions. The application code 1950 can include application logic 1952, library functions 1954, and file I/O functions 1956 associated with the application.

Storage device 1948 can also include application variables 1962 that can include one or more storage locations configured to receive input variables 1964. The application variables 1962 can include variables that are generated by the application or otherwise local to the application. The application variables 1962 can be generated, for example, from data retrieved from an external source, such as a user or an external device or application. The processor can execute the application code 1950 to generate the application variables 1962 provided to storage device 1948.

One or more memory locations can be configured to store device data 1966. Device data 1966 can include data that is sourced by an external source, such as a user or an external device. Device data 1966 can include, for example, records being passed between servers prior to being transmitted or after being received. Other data 1968 might also be supplied.

Storage device 1948 can also include a log file 1980 having one or more storage locations 1984 configured to store results of the application or inputs provided to the application. For example, the log file 1980 can be configured to store a history of actions.

The memory elements of FIG. 19 might be used for a server or computer that interfaces with a user, generates keyword lists, and/or manages other aspects of a process described herein.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method of processing campaign datasets wherein a given campaign dataset comprises data representing selections and instructions to be submitted to an online platform to execute an online campaign represented by the given campaign dataset, wherein the given campaign dataset can be machine-generated, human-generated, or a combination of both, the method comprising:

under control of one or more processors of a computer system executing executable instructions stored in a non-transitory computer-readable storage medium that, when executed by the one or more processors of the computer system, performing the steps of:

(a) training a neural network to form a trained neural network, at least in part, with a plurality of input human-generated campaign datasets and a plurality of ground truths for the plurality of input human-generated campaign datasets, wherein a given ground truth of the plurality of ground truths represents a quality metric indicating a quality of a given input human-generated campaign dataset of the plurality of input human-generated campaign datasets;

(b) generating a machine-generated candidate campaign dataset using the trained neural network;

(c) identifying at least one first similar prior campaign dataset from feedback records comprising a plurality of prior campaign datasets by computing a respective degree of similarity score between the machine-generated candidate campaign dataset and each of the plurality of prior campaign datasets, wherein a given degree of similarity score is computed using one or more campaign dataset elements comprising at least one of language, location, demographics, or product/service type, and wherein the respective degree of similarity scores between the machine-generated candidate campaign dataset and the at least one first similar prior campaign dataset exceeds a similarity score threshold;

(d) computing a first evaluation scam of the machine-generated candidate campaign dataset for a first online campaign using the machine-generated candidate campaign dataset, the first evaluation score comprising a first targeting value and respective confidence value, wherein the first evaluation score is computed based on campaign results associated with the at least one first similar prior campaign dataset;

(e) when the first evaluation score satisfies a first criteria, generating a request for a human-generated candidate campaign dataset;

(f) identifying at least one second similar prior campaign dataset from the feedback records comprising the plurality of prior campaign datasets by computing a respective degree of similarity score between the human-generated candidate campaign dataset and each of the plurality of prior campaign datasets, wherein the given degree of similarity score is computed using one or more campaign dataset elements comprising at least one of language, location, demographics, or product/service type, and wherein the respective degree of similarity scores between the human-generated candidate campaign dataset and the at least one second similar prior campaign dataset exceeds the similarity score threshold, (g) computing a second evaluation score of the human-generated candidate campaign dataset for a second online campaign using the human-generated candidate campaign dataset, the second exaltation score comprising a second targeting value and respective confidence value, wherein the second evaluation score is computed based on campaign results associated with the at least one second similar prior campaign dataset;

(h) based on the first evaluation score and the second evaluation score, selecting the machine-generated candidate campaign dataset or the human-generated candidate campaign dataset to be a submitted campaign dataset, wherein in at least one instance, the submitted campaign dataset is the machine-generated candidate campaign dataset and the first evaluation score reflects an improvement over the second evaluation score;

(i) submitting the submitted campaign dataset to the online platform;

(j) obtaining a campaign result resulting from the submitted campaign dataset; and (k) storing the submitted campaign dataset and the campaign result as the feedback records comprising the plurality of prior campaign datasets for future campaigns.

2. The computer-implemented method of claim 1, further comprising:

generating a subsequent machine-generated campaign dataset;

obtaining a subsequent human-derived campaign dataset derived from human selection of campaign options;

determining a first confidence score representing a computer-generated confidence of the subsequent machine-generated campaign data based on at least the feedback records;

determining a second confidence score representing a first human-determined confidence of the subsequent human-derived campaign dataset;

based on the first confidence score and the second confidence score, selecting one of the subsequent machine-generated campaign dataset and the subsequent human-derived campaign dataset to be a subsequent submitted campaign dataset;

submitting the subsequent submitted campaign dataset to the online platform;

determining a subsequent campaign result resulting from the subsequent submitted campaign dataset; and storing the subsequent campaign result as part of the feedback records for the future campaigns.

3. The computer-implemented method of claim 2, further comprising:

determining a third evaluation score representing a second human-determined confidence of the subsequent machine-generated campaign dataset;

determining a fourth evaluation score representing a machine-determined confidence of the subsequent human-derived campaign dataset based on at least the feedback records;

based on the first confidence score, the second confidence score, the third evaluation score, and the fourth evaluation score, selecting one of the subsequent machine-generated campaign dataset and the subsequent human-derived campaign dataset to be the subsequent submitted campaign dataset; and updating the feedback records based on the subsequent campaign result, the third evaluation score, and the fourth evaluation score.

4. The computer-implemented method of claim 2, wherein the first confidence score satisfies the first criteria if the first confidence score is below a predetermined machine confidence threshold.

5. The computer-implemented method of claim 2, wherein selecting one of the machine-generated candidate campaign dataset and the human-generated candidate campaign dataset comprises selecting based on which has a higher confidence score.

6. The computer-implemented method of claim 1, wherein obtaining the campaign result comprises determining a quality metric representing an estimated value of running an online campaign represented by the submitted campaign dataset.

7. The computer-implemented method of claim 1, further comprising:

prompting for human input on the machine-generated candidate campaign dataset when the first evaluation score satisfies a second criteria.

8. The computer-implemented method of claim 7, wherein the first evaluation score satisfies the second criteria when the first evaluation score is below a first threshold.

9. The computer-implemented method of claim 1, wherein identifying the similar prior campaign dataset is based, in part, on a human input of an assessment of similarity.

10. The computer-implemented method of claim 1, further comprising generating inputs to one or more online platforms based on the submitted campaign dataset.

11. The computer-implemented method of claim 10, further comprising:

selecting among a plurality of online platform feedback from the one or more online platforms during a campaign.

12. A computer-implemented method of operating an online campaign, wherein a given online campaign is initiated by submission of a given campaign dataset comprising data representing selections and instructions submitted to an online platform to execute the online campaign represented by the given campaign dataset, wherein the given campaign dataset can be machine-generated, human-generated, or a combination of both, the method comprising:

under control of one or more processors of a computer system executing executable instructions stored in a non-transitory computer-readable storage medium that, when executed by the one or more processors of the computer system, performing the steps of:

(a) accessing a trained neural network trained, at least in part, using a plurality of input campaign datasets and a plurality of ground truths for the plurality of input campaign datasets, wherein a given ground truth of the plurality of ground truths represents a quality metric indicating a quality of a given input campaign dataset of the plurality of input campaign datasets;

(b) generating a first campaign dataset;

(c) identifying at least one first similar prior campaign dataset from feedback records comprising a plurality of prior campaign datasets by computing a respective degree of similarity score between the first campaign dataset and each of the plurality of prior campaign datasets, wherein a given degree of similarity score is computed using one or more campaign dataset elements comprising at least one of language, location, demographics, or product/service type, and wherein the respective degree of similarity scores between the first campaign dataset and the at least one first similar prior campaign dataset exceeds a similarity score threshold;

(d) determining a first evaluation score for the first campaign dataset, the first evaluation score comprising a first targeting value and respective confidence value, wherein the first evaluation score is computed based on campaign results associated with the at least one first similar prior campaign dataset;

(e) obtaining a first campaign result;

(f) generating a second campaign dataset, wherein at least one of the first campaign dataset and the second campaign dataset is a machine-generated campaign dataset that is generated by the trained neural network;

(g) determining if the first campaign dataset and the second campaign dataset are similar by computing a respective degree of similarity score between the first campaign dataset and the second campaign dataset, wherein the given degree of similarity score is computed using one or more campaign dataset elements comprising at least one of language, location, demographics, or product/service type;

(h) if the first campaign dataset and the second campaign dataset are similar, computing a second evaluation score of the second campaign dataset from the first campaign result and/or the first evaluation score;

(i) initiating a second campaign using the second campaign dataset by submitting the second campaign dataset to the one or more online platforms;

(j) determining, from the second campaign dataset, a further evaluation score of an ongoing performance of the second campaign;

(k) if the further evaluation score is below a threshold, determining one or more adjustments;

(l) for each adjustment, determining a plurality of adjusted campaign datasets;

(m) for each adjusted campaign dataset in the plurality of adjusted campaign datasets, determining an adjusted campaign dataset evaluation score;

(n) selecting a replacement campaign dataset from among the plurality of adjusted campaign datasets based on their respective adjusted campaign dataset evaluation scores, wherein in at least one instance the replacement campaign dataset is the machine-generated candidate campaign dataset; and (o) modifying the second campaign with the one or more online platforms to use the replacement campaign dataset.

13. The computer-implemented method of claim 12, further comprising:
generating a subsequent machine-generated campaign dataset;
obtaining a subsequent human-derived campaign dataset derived from human selection of campaign options;
determining a first confidence score representing a computer-generated confidence of the subsequent machine-generated campaign data;
determining a second confidence score representing a first human-determined confidence of the subsequent human-derived campaign dataset;
based on the first confidence score and the second confidence score, selecting one of the subsequent machine-generated campaign dataset and the subsequent human-derived campaign dataset to be a subsequent submitted campaign dataset;
submitting the subsequent submitted campaign dataset to the one or more online platforms;
determining a subsequent campaign result resulting from the subsequent submitted campaign dataset; and
storing the subsequent campaign result as part of feedback records for future campaigns.

14. The computer-implemented method of claim 13, further comprising:
determining a third evaluation score representing a second human-determined confidence of the subsequent machine-generated campaign dataset;
determining a fourth evaluation score representing a machine-determined confidence of the subsequent human-derived campaign dataset based on at least feedback records;
based on the first confidence score, the second confidence score, the third evaluation score, and the fourth evaluation score, selecting one of the subsequent machine-generated campaign dataset and the subsequent human-derived campaign dataset to be the subsequent submitted campaign dataset; and
updating the feedback records based on the subsequent campaign result, the third evaluation score, and the fourth evaluation score.

15. The computer-implemented method of claim 12, further comprising:
prompting for human input on the machine-generated campaign dataset.

16. The computer-implemented method of claim 15, wherein the first evaluation score satisfies a second criteria when the first evaluation score is below a first threshold.

17. The computer-implemented method of claim 12, wherein identifying the similar prior campaign dataset is based, in part, on a human input of an assessment of similarity.

18. The computer-implemented method of claim 1, wherein the submitted campaign dataset includes targeting data structures comprising data representing keywords, a selection of user interests, an encoding of a distribution of targets in terms of single users or user groups, and embeddings in a learned or predefined targeting space.

19. The computer-implemented method of claim 1, wherein the given degree of similarity score is a Jaccard coefficient or a distance metric.

20. The computer-implemented method of claim 1, wherein the given degree of similarity score is computed by a neural network.

* * * * *